US008660992B2

(12) United States Patent
Yoshida et al.

(10) Patent No.: US 8,660,992 B2
(45) Date of Patent: *Feb. 25, 2014

(54) METHOD AND SYSTEM FOR ON-DEMAND COMMUNITIES

(75) Inventors: Norimasa Yoshida, Daly City, CA (US); Jamie Veere Coleman Grenney, San Francisco, CA (US); Likuo Lin, Redwood City, CA (US); Justin Lin, Redwood City, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/554,934

(22) Filed: Jul. 20, 2012

(65) Prior Publication Data

US 2012/0311054 A1  Dec. 6, 2012

Related U.S. Application Data

(63) Continuation of application No. 12/151,302, filed on May 5, 2008.

(60) Provisional application No. 60/927,616, filed on May 4, 2007.

(51) Int. Cl.
*G06F 17/30* (2006.01)

(52) U.S. Cl.
USPC .......................................... 707/661; 707/681

(58) Field of Classification Search
USPC .................................................. 707/661, 681
See application file for complete search history.

(56) References Cited

U.S. PATENT DOCUMENTS

| 6,029,175 | A  | 2/2000  | Chow et al.    |
| 6,959,308 | B2 | 10/2005 | Gramsamer et al. |
| 7,395,315 | B2 | 7/2008  | Colson et al.  |
| 7,698,160 | B2 | 4/2010  | Beaven et al.  |
| 7,707,249 | B2 | 4/2010  | Spataro et al. |
| 7,818,298 | B2 | 10/2010 | Barker et al.  |
| 7,836,019 | B2 | 11/2010 | Barker et al.  |
| 7,991,790 | B2 | 8/2011  | Barker et al.  |
| 8,082,301 | B2 | 12/2011 | Ahlgren et al. |
| 8,095,413 | B1 | 1/2012  | Beaven         |
| 8,095,594 | B2 | 1/2012  | Beaven et al.  |

(Continued)

OTHER PUBLICATIONS

Non-Final Office Action from U.S. Appl. No. 11/825,393, dated Jul. 7, 2009.

(Continued)

*Primary Examiner* — Son T Hoang
(74) *Attorney, Agent, or Firm* — Zilka-Kotab, PC

(57) ABSTRACT

In an embodiment, communities are generated on demand. In this specification a community is a group of webpages in which users share ideas with one another by posting ideas and sending messages for one another to read. An on-demand community is a community that may be created via tools specialized for creating communities, with just a few keys strokes and/or mouse clicks and by adding information (e.g., about the members and/or the topic or set of topics that the community is focused upon), such that a community may be established within a short amount of time, such as a few minutes or a few hours. Optionally, the communities may be initially populated with ideas related to a particular topic or set of topics. Optionally, each member may be provided with tools for establishing one or more profile page and/or one or more friend pages.

7 Claims, 22 Drawing Sheets

(56) References Cited

U.S. PATENT DOCUMENTS

| | | |
|---|---|---|
| 8,275,836 B2 | 9/2012 | Beaven et al. |
| 2001/0049819 A1 | 12/2001 | Pereboom |
| 2002/0019827 A1 | 2/2002 | Shiman et al. |
| 2003/0154387 A1 | 8/2003 | Evans et al. |
| 2004/0002988 A1 | 1/2004 | Seshadri et al. |
| 2004/0073443 A1* | 4/2004 | Gabrick et al. .................. 705/1 |
| 2004/0210550 A1* | 10/2004 | Williams et al. .................. 707/1 |
| 2004/0230903 A1 | 11/2004 | Elza et al. |
| 2005/0010635 A1 | 1/2005 | Schwesig et al. |
| 2005/0240428 A1* | 10/2005 | Gabrick et al. .................. 705/1 |
| 2006/0031308 A1 | 2/2006 | Colson et al. |
| 2006/0053196 A1 | 3/2006 | Spataro et al. |
| 2006/0136511 A1 | 6/2006 | Ngo et al. |
| 2006/0143558 A1 | 6/2006 | Albornoz et al. |
| 2007/0060099 A1 | 3/2007 | Ramer et al. |
| 2007/0061384 A1 | 3/2007 | Harrington et al. |
| 2007/0100817 A1 | 5/2007 | Acharya et al. |
| 2007/0100960 A1 | 5/2007 | Eichstaedt et al. |
| 2007/0150515 A1 | 6/2007 | Brave et al. |
| 2007/0220417 A1 | 9/2007 | Mathew et al. |
| 2007/0226204 A1 | 9/2007 | Feldman |
| 2007/0226807 A1 | 9/2007 | Ginter et al. |
| 2007/0260648 A1 | 11/2007 | Friesenhahn et al. |
| 2008/0104408 A1 | 5/2008 | Mayer |
| 2008/0127310 A1 | 5/2008 | Robbins et al. |
| 2008/0201159 A1* | 8/2008 | Gabrick et al. .................. 705/1 |
| 2008/0306883 A1 | 12/2008 | Baffier et al. |
| 2009/0013011 A1 | 1/2009 | Barker et al. |
| 2009/0049053 A1 | 2/2009 | Barker et al. |

OTHER PUBLICATIONS

Notice of Allowance from U.S. Appl. No. 11/879,535, dated Apr. 5, 2010.

Non-Final Office Action from U.S. Appl. No. 11/879,535, dated Sep. 2, 2009.

Final Office Action from U.S. Appl. No. 11/880,197, dated Mar. 30, 2010.

Notice of Allowance from U.S. Appl. No. 11/880,197, dated Mar. 21, 2011.

Non-Final Office Action from U.S. Appl. No. 11/880,197, dated Aug. 17, 2009.

Final Office Action from U.S. Appl. No. 11/893,617, dated Oct. 12, 2011.

Non-Final Office Action from U.S. Appl. No. 11/893,617, dated Oct. 27, 2010.

Notice of Allowance from U.S. Appl. No. 12/803,204, dated Aug. 19, 2010.

* cited by examiner

800

Salesforce for Google AdWords Blog

Google Dominates Q1 with $3.66B in Revenue

Yesterday Google announced its first quarter results that blew past the estimates of many industry analysts. Here's the quick and dirty on Google's Q1:

- Revenue: $3.66 billion, up 63% from $2.25 billion a year ago
- Profit: $1 billion, or $3.18 a share, up from $592.3 million, or $1.95 a share, a year earlier It was also the second consecutive quarter in which Google earned $1billion. As reported by the AP, this is more than many more-established media companies make in an entire year.

As most people know, Google's core business is online advertising, with 99% of revenues coming from ad clicks purchased through the Google AdWords. Surprisingly, even with some stiff competition coming from Yahoo (recently released Panama) and Microsoft (recently released AdCenter), Google's ad revenues are clearly dominating those from its rivals. Many Salesforce customers note that Google's ad system delivers higher quality web traffic and therefore, more qualified leads.

Here's the breakdown from eMarketer (check out their full report)

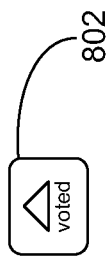
22 points — 802

FIG. 8A

Edit Single Fields on Double Click 810

Name Mr. Marc Benioff _____ Home Phone
Account salesforce.com _____ Mobile
Title Executive Officer [ ← ] _____ Other Phone
Department _____ Fax
Birthdate _____ Email I think it would be great, that when you are viewing a record (e.g. a contact), you could double click on a specific field to quickly edit that fields value.

This is faster than having to click "Edit" and then change the value, then click "Save".

It would improve end user productivity to be able to edit things quickly on the fly like this.

29 Comments > | Posted by 🔲 ryan_hallman to User Experience | Jan 17
814 — 816 — 818

8130 [ 🖊 promote ]
812

Setup • Help & Training • Logout  Appexchange  IdeaExchange ideaexchange

1000

Home | Accounts | Contacts | Communities | Ideas | Reports | Dashboards

Search  916

[ ] Go!
[ ] Limit to Items I own

Advanced Search... 918

Create New...

Recent Items
- Salesforce Product Roadmap
- Jason Bobe
- Channel News
- Local User Groups - Japan
- Dupe Alerts
- Freeze Column Headers in Reports
- Expand Networks
- Getting the hour from Date/Time field
- Local User Groups-United States
- Dreamforce 2007

Recycle Bin

Community Metrics  1002

Help for this Page [?]

View: Community Metrics [v]  Edit | Create New View  1001

946  A|B|C|D|E|F|G|H|I|J|K|L|M|N|O|P|Q|R|S|T|U|V|W|X|Y|Z|Other|All 1003  1004  [Change Owner]  1006  1008  1010  1012  1014  1016

| Action | Community Name ▲ | Language | Page Views | Registered Users | Ideas | Votes | Comments |
|---|---|---|---|---|---|---|---|
| [ ] Edit | Del | Analytics News | English | 3,309 | 150 | 394 | 9,381 | 311 |
| [ ] Edit | Del | Best of Successforce | English | 128,125 | 3,000 | 58 | 13,551 | 0 |
| [ ] Edit | Del | Channel News | English | 2,380 | 285 | 256 | 5,008 | 311 |
| [ ] Edit | Del | Crush My Quota | English | 3,309 | 884 | 394 | 9,381 | 311 |
| [ ] Edit | Del | Developer News | English | 3,309 | 1,289 | 394 | 9,381 | 311 |
| [ ] Edit | Del | Dreamforce 2007 | English | 2,895 | 5,876 | 707 | 19,381 | 597 |
| [ ] Edit | Del | Local User Groups - Japan | Japanese | 2,863 | 1,297 | 235 | 1,207 | 26 |
| [ ] Edit | Del | Local User Groups - United States | English | 2,895 | 5,876 | 707 | 19,381 | 597 |
| [ ] Edit | Del | Marketing News | English | 3,309 | 835 | 394 | 9,381 | 311 |
| [ ] Edit | Del | SAAS News | English | 3,309 | 227 | 394 | 9,381 | 311 |
| [ ] Edit | Del | Sales News | English | 3,309 | 883 | 394 | 9,381 | 311 |
| [ ] Edit | Del | Salesforce Product Roadmap | English | 91,846 | 4,001 | 355 | 4,799 | 606 |
| [ ] Edit | Del | Salesforce Product Roadmap | French | 91,846 | 200 | 355 | 4,799 | 606 |
| [ ] Edit | Del | Salesforce Product Roadmap | Spanish | 91,846 | 57 | 28 | 1,579 | 207 |

Show me fewer▲ records per first page

A|B|C|D|E|F|G|H|I|J|K|L|M|N|O|P|Q|R|S|T|U|V|W|X|Y|Z|Other|All
Home | Accounts | Contacts | Communities | Ideas | Reports | Dashboards | All Tabs
Copyright © 2000-2007 salesforce.com, inc. All rights reserved. | Privacy Statement | Security Statement | Terms of Use | Accessibility

METHOD AND SYSTEM FOR ON-DEMAND COMMUNITIES

CLAIM OF PRIORITY

This application is a continuation of U.S. application Ser. No. 12/151,302, filed May 5, 2008, which claims the benefit of U.S. Provisional Patent Application No. 60/927,616, filed May 4, 2007, the entire contents of which are incorporated herein by reference

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007;

U.S. patent application Ser. No. 11/893,617 entitled METHOD AND SYSTEM FOR PUSHING DATA TO SUBSCRIBERS IN AN ON-DEMAND SERVICE, by Timothy Barker et al., filed Aug. 15, 2007;

U.S. patent application Ser. No. 11/879,535 entitled SYSTEM AND METHOD FOR TRACKING DOCUMENTS IN AN ON-DEMAND SERVICE, by Timothy Barker et al., filed Jul. 17, 2007; and U.S. patent application Ser. No. 12/151,302 entitled METHOD AND SYSTEM FOR ON-DEMAND COMMUNITIES, by Norimasa Yoshida et al., filed May 5, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to method and system for on-demand communities in a database network system, and more particularly to method and system for on-demand communities in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Some forms of obtaining customer feedback are focus groups and user meetings. However, focus groups and user meetings can be expensive to run. Additionally, it can be difficult to determine whether the consensus of a focus group is representative of the actual customer base, because different focus groups may at least sometimes indicate different conclusions. Conventionally, applications, such as databases, file systems, word processors and the like, were delivered to the end users in the form of software. Feedback mechanisms for these products exist typically in the form of problem reports, quality surveys and the like.

With the advent of the web, however, software-like utility is increasingly delivered to users as a service. These so named "software as a service" approaches may include a group of end users, who may wish to use the service offering collaboratively, or who may wish to share their input as a community, making the old problem report or feedback survey cumbersome or unsatisfactory.

Accordingly, it is desirable to provide techniques enabling sharing ideas to improve service offerings.

BRIEF SUMMARY

In an embodiment, communities for enterprises and/or business are generated on demand. In this specification a community is a group of webpages in which users share ideas with one another by posting ideas and sending messages for one another to read. An on-demand community is a community that may be created via tools specialized for creating communities, with just a few keys strokes and/or mouse clicks and by adding information (e.g., about the members and/or the topic or set of topics that the community is focused upon), such that a community maybe established within a short amount of time, such as a few minutes or a few hours. In other words, in an embodiment the focus of the communities may be on on-demand enterprise communities, which are communities structured around a business' ecosystem: partners, customers, vendors, employees, etc.). Optionally, the communities may be initially populated with ideas related to a particular topic or set of topics. Optionally, each member may be provided with tools for establishing one or more profile page and/or one or more friend pages. Optionally, each member may be provided with tools for posting and/or tracking ideas and/or comments on ideas. Optionally, each member may be provided with tools for tracking and/or casting votes on ideas. Optionally, the users may be provided with tools for adding widgets to posted ideas, profiles pages, and/or friends pages. Optionally, the users may post RSS feeds.

In accordance with embodiments, there are provided mechanisms and methods for on-demand communities. These mechanisms and methods for on-demand communities can enable embodiments to provide greater participation in providing feedback and/or developing new products. The ability of embodiments to provide on demand groups can enable greater customer loyalty.

In an embodiment and by way of example, a method for on-demand communities is provided. The method embodiment may include self-forming groups, providing wigetization, providing RSS feeds, for example.

While the present invention is described with reference to an embodiment in which techniques for on-demand communities are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 8A shows an example of an idea having a widget;

FIG. 8B shows an example of another embodiment of a posting of an idea;

FIG. 10 shows a screenshot of an example of a community page showing a metrics view;

DETAILED DESCRIPTION

General Overview

Figure 1:
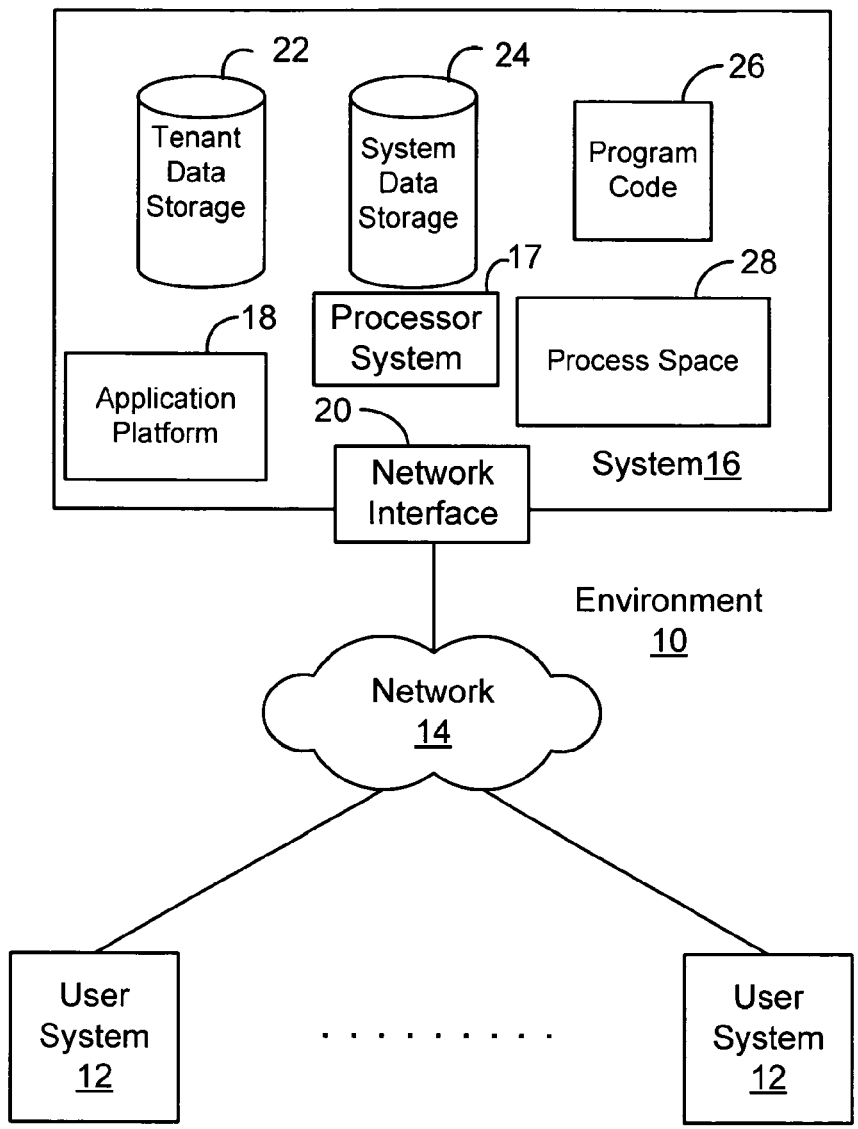
FIG. 1 illustrates an environment wherein an on-demand database service might be used.

Systems and methods are provided for on-demand communities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing method and system for an on-demand community is provided. In this specification a community is a group of users that share a common interest and tend to communicate with one another about that common interest. A community website is a website in which users share ideas that re related to the community. An on-demand community is a community website that is created by the tenant using pre-established tools specialized for creating communities. In an embodiment, the focus of the communities may be on on-demand enterprise communities, which are communities structured around a business' ecosystem: partners, customers, vendors, employees, etc.).

In an embodiment, there may be several types of webpages associated with a community website. A self-forming group is a group that forms on its own. The combination of the community website and the self-forming groups creates a unique environment for sharing ideas about a topic, which has greater user participation than a community without self-forming groups, and therefore tends to generate more ideas and/or better ideas about the topic. The self-forming groups increase the likelihood that the users of a particular self forming groups will be aware of the discussion and developments associated with the concerns of that self-forming group. Consequently, the self-forming groups increase the likelihood that the users interested in a topic will be aware of the discussion associated with that topic.

The community may include various features and/or tools that encourage and/or enable the self-forming of groups, thereby causing the value of the website to increase exponentially with the increase in the number of members that belong to the self-forming groups. Additionally, some content may be placed initially on the website at the launch of the website, which gives an initial significant value to the website that is linear proportional to the number of users that are able to the view the content and that are expected to be interested in the content. Enabling user interaction with one another, via the posting of new ideas, the commenting on ideas, and/or participating in discussions causes the value of the website to increase according the square of the number of users that are likely to access the site, which ensures a larger growth rate in the value of the website than were the users not able to easily interact with one another.

In an embodiment, the user and/or administrator are provided with tools that encourage self-forming groups. For example, the website may include widgetization, self-forming groups, profile pages, and/or lists of or pages of friends. A widget is a control element of a Graphical User Interface (GUI) that displays an information arrangement changeable by the user, such as a window or a text box, which will be discussed further, below. Profile pages are and example of an element of the community website that may encourage self forming groups by encouraging users to view one another's profiles and send comments to one another related to information in the profiles, such as by sending e-mails or by posting comments on one another's profile webpages. Thus, the combination of the profile webpages with the community website cooperate with one another to further increase the amount of discussion, ideas, and comments related to the topic that the community website is based.

The user may also be able to establish friend pages in addition to or instead of profile pages. Friend pages describe friends of a particular user. The friend pages may be created by a first user to establish one or more other users (e.g., a second user) as friend of that first user. A user may establish multiple friend pages, each having information about one or more friends. In an embodiment, the friend pages are only viewable by the user that created them. In another embodiment, the friend pages are viewable by an administrator and/or by those that the user gave permission to view the friend pages. In another embodiment, the friend pages are public and available for anyone to view.

The profile pages and friend pages may include information that a user may want to display about themselves and/or information that the user may want to store about other members of the community website. For example, the profile and friends pages may include links for the user to store their ideas, the items they voted on, the discussions they participated in, their watchlist, their profile, their friends, and/or their communities. In an alternative embodiment, the user may choose whether to allow others to view their ideas, the items they voted on, the discussions they participated in, their watchlist, their profile, their friends, and/or their communities.

A characteristic of a widget may be to provide a single interaction point for the direct manipulation of a given kind of data. Widgets may be basic visual building blocks which combined in an application hold all the data processed by the application and the available interactions on this data. Widgetization is the process of creating a widget.

Widgetization allows the users and/or administrators to copy widgets from a website of an organization providing the on-demand community for the sponsoring organization to the website provided. The website may include tools that enable and/or facilitate an administrator to place the widget of an already prepared article about an idea, for example, within a posting of an idea, comment, within static text, and/or other location of the website. For example, the administrator may be enabled to snip from the host's webpage articles, webpages, and/or portions of articles and/or webpages and include the snips within a posting on the website of the sponsoring organization with which the administrator is associated.

In an embodiment, administrative tools may include a page for viewing websites categorized according to their type (e.g., news or customer feedback). In an embodiment, the Administrative tools may include a page for viewing the name, language, and/or URL of the community. In an embodiment, administrative tools may allow administrators to view statistics about the community websites. For example, the administrator may be able to view the number of pages in the website, the numbers of users on the website, the number of ideas posted on the website, the number of votes posted to the website, number of discussions on the websites, categories of discussion, categories of votes, and categories of ideas, and/or other statistics. There may be one or more pages for viewing and changing the settings of one or more community websites, a page for idea moderation, an idea details page, a contact page (e.g., listing people to contact, such as the CEO).

There may be a variety of other features associated with the community website. For example, the on-demand community website may include a users page, a contacts page, an ideas page, a comments page, a vote page, reports and dashboard page, and/or a search page. The user page may be used for storing information about the user.

In an embodiment, there may be a user page for the user and/or another user page for an administrator. In an embodiment, the same user page may be accessible by the user and/or the administrator. In an embodiment, the contacts page may be a page that lists the contact information of various officers of the organization sponsoring the website, such as the CEO, and/or other people of interest the users. The idea page may be for posting and/or viewing ideas related to a service, product and/or interest of the organization sponsoring the website. The comments page may include comments about the ideas and may allow users to post comments. A vote page may allow a user and/or administrator to vote and/or track the votes of a particular idea and/or all ideas posted. A reports and dashboard page may be a page available to an administrator for viewing various reports about the ideas and/or votes and/or for accessing various administrative tools.

A search page may allow a user and/or administrator to search information on the website, e.g., via keyword searching. Any of the pages of the website may have different versions that are available to different types of users, such as one version for an administrator, one version for a user, one version for a user that is an employee, one version for a user that is a customer, and/or one version for special customers.

The website may provide tools for site administration, users, posting ideas, voting and/or down voting an idea, commenting on an idea and/or tracking comments on an idea, searching, and/or for instilling themes within the website (e.g., Apex™ Pages that allow the tenant to customize the webpage using the APEX programming language). The website may include a "my pages" for user, which may be a page for users to store and/or track information of interest to them. The website may include a feeds tab supporting Simple Syndication (RSS) feeds for example. The website may include forums or discussions on a variety of topics. The website may include moderation and/or report abuse tools that allow the user to report abuse and/or allows the administrators to moderate discussions, forums, comments and/or the posting of ideas by fro example, removing and/or editing content and/or postings. The moderation tools may also allow the administrator to restrict access and prevent spamming. There may be a different level of access granted to guests than to registered users, paying users, and/or other types of users. The website may provide analytics by for example providing analytical tools that are available to administrators, officers of the sponsoring organization, and/or users, depending on the nature of the themes of the community website. There may be an experimental mode of voting for beta testing. There may be user alerts that the user may set to alert the user when activity has occurred related to an item of interest, such as an idea of interest, a comment of interest, a discussion of interest, and/or a vote of interest. The related activity may include posting a related idea, posting a comment, a change in a vote and/or another activity. The community website may include Really Simple Syndication (RSS), which allows for a web feed that may be integrated within the community website for automatically frequently updating material posted on the website. There may be status tags that are available for viewing by the sponsoring organization and/or the organization providing the website to view the status of the website. The status of the website may include delivered, in progress/under development, interest expressed (but no decision made as whether to sponsor the website), active, inactive, and/or other status. The website may include free text HTML. The websites may be used by companies of all sizes to create communities. Next, mechanisms and methods for providing FOR ON-DEMAND COMMUNITIES will be described with reference to example embodiments.

System Overview

FIG. 1 illustrates an environment wherein an on-demand database service might be used. As illustrated in FIG. 1 (and in more detail in FIG. 2) user systems 12 might interact via a network 14 with an on-demand database service 16. Some on-demand database services may store information from one or more tenants stored into tables of a common database image to form a multi-tenant database system (MTS). Accordingly, on-demand database service 16 and System 16 will be used interchangeably herein. A database image may include one or more database objects. A relational database management system (RDMS) or the equivalent may execute storage and retrieval of information against the database object(s). Some on-demand database services may include an application platform 18 that enables creation, managing and executing one or more applications developed by the provider of the on-demand database service, users accessing the on-demand database service via user systems 12, or third party application developers accessing the on-demand database service via user systems 12.

The users of those user systems 12 might be users in differing capacities, and the capacity of a particular user system 12 might be entirely determined by permissions (permission levels) for the current user. For example, where a salesperson is using a particular user system 12 to interact with System 16, that user system has the capacities allotted to that salesperson. However, while an administrator is using that user system to interact with System 16, that user system has the capacities allotted to that administrator. In systems with an hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems 12 might communicate with System 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at System 16. Such HTTP server might be implemented as the sole network interface between System 16 and network 14, but other techniques might be used as well or instead. In some implementations, the interface between System 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations are contemplated.

In one aspect, the system shown in FIG. 1 implements a web-based customer relationship management (CRM) system. For example, in one aspect, System 16 includes application servers configured to implement and execute CRM software applications as well as provide related data, code, forms, Web pages and other information to and from user systems 12 and to store to, and retrieve from, a database system related data, objects and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain aspects, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of System 16 is shown in FIG. 1, including a network interface 20, application platform 18, storage 22 for tenant data, storage 24 for system data accessible to System 16 and possibly multiple tenants, program code 26 for implementing various functions of System 16, and a process space 28 for executing MTS system processes and tenant-specific processes, such as running applications as part of an application hosting service. Additional processes that may execute on System 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by System 16 or other systems or servers. For example, the user interface device can be used to access data and applications hosted by System 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, System 16 (and additional instances of an MTS, where more than one is present) and all of their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring System 16 to intercommunicate and to process web pages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. In this specification the terms machine readable medium and computer readable medium do not include transmission medium. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

According to one embodiment, each System 16 is configured to provide web pages, forms, applications, data and media content to user (client) systems 12 to support the access by user systems 12 as tenants of System 16. As such, System 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
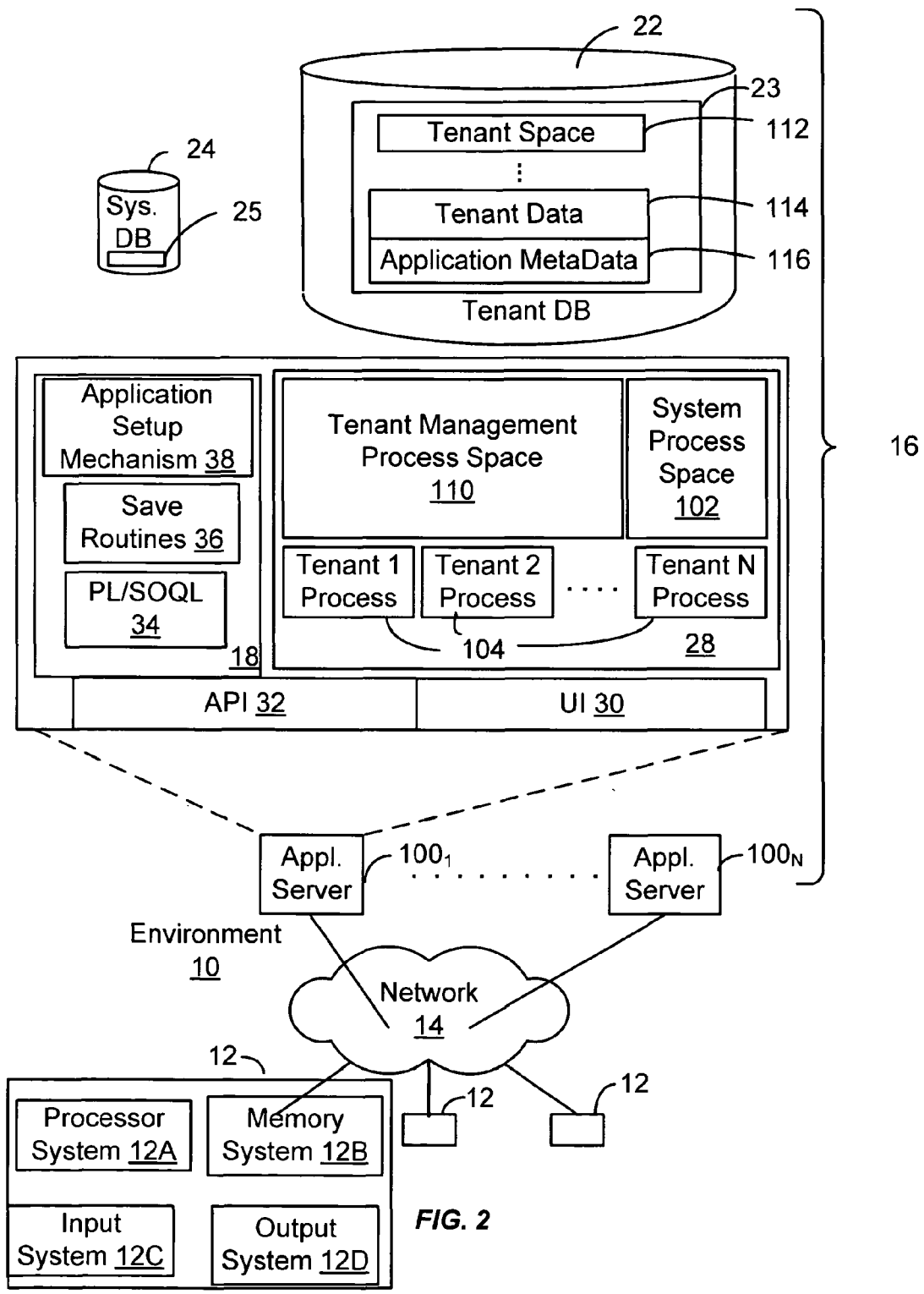
FIG. 2 illustrates elements of FIG. 1 and various possible interconnections between these elements in an embodiment.

FIG. 2 illustrates elements of System 16 and various interconnections in an embodiment. As shown by FIG. 2, example System 16 includes a network interface 20 (of FIG. 1) implemented as a set of HTTP application servers 100, an application platform 18 and database objects 22, 24. Also shown is system process space 102, including individual tenant process spaces 104 and a tenant management process space 110. Each application server 100 may be configured to access storage 22 and the tenant data 23 therein, and access storage 24 and the system data 25 therein to serve requests of user systems 12. The tenant data 23 might be divided into individual tenant storage areas 112, which can be either a physical arrangement or a logical arrangement of data. Within each tenant storage area 112, user storage 114 and application storage 116 might be similarly allocated for each user. For example, a copy of a user's most recently used (MRU) items might be stored to user storage area 114. Similarly, a copy of MRU items for an entire organization that is a tenant might be stored to tenant storage area 112. A user interface UI 30 provides a user interface and an API 32 provides an application programmer interface to System 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant database 22 by save routines 36 for execution by subscribers as one or more tenant processes 104 managed by tenant management process 110 for example. Invocations to such applications may be coded using PL/SOQL 34 that provides a programming language style interface extension to API 32. For a detailed description of PL/SOQL language embodiments reference may be had to commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., system data 25 and tenant data 23, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are typical protocols for communicating between servers 100 and the database system; however, it will be apparent to one skilled in the art that other transport protocols may be used to optimize the system depending on the network interconnect used.

In certain aspects, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers 100, and three requests from different users could hit the same server 100. In this manner, System 16 is multi-tenant, wherein System 16 handles storage of, and access to, different objects, data and applications across disparate users and organizations.

As an example of storage, one tenant might be a company that employs a sales force where each salesperson uses System 16 to manage their sales process. Thus, a user might maintain contact data, leads data, customer follow-up data, performance data, goals and progress data, etc., all applicable to that user's personal sales process (e.g., in tenant database 22). In an example MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by System 16 that are allocated at the tenant level while other data structures might be managed at the user level. Because an MTS might support multiple tenants including possible competitors, the MTS should have security protocols that keep data, applications, and application use separate. Also, because many tenants will opt for access to an MTS rather than maintain their own system, redundancy, up-time, and backup are additional critical functions and need to be implemented in the MTS. In addition to user-specific data and tenant-specific data, System 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from System 16 that may require one or more queries to database system 22 and/or database system 24. System 16 (e.g., an application server 100 in System 16) automatically generates one or more SQL statements (the SQL query) designed to access the desired information. Database system 24 may generate query plans to access the requested data from the database.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields. It should be understood that "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3:
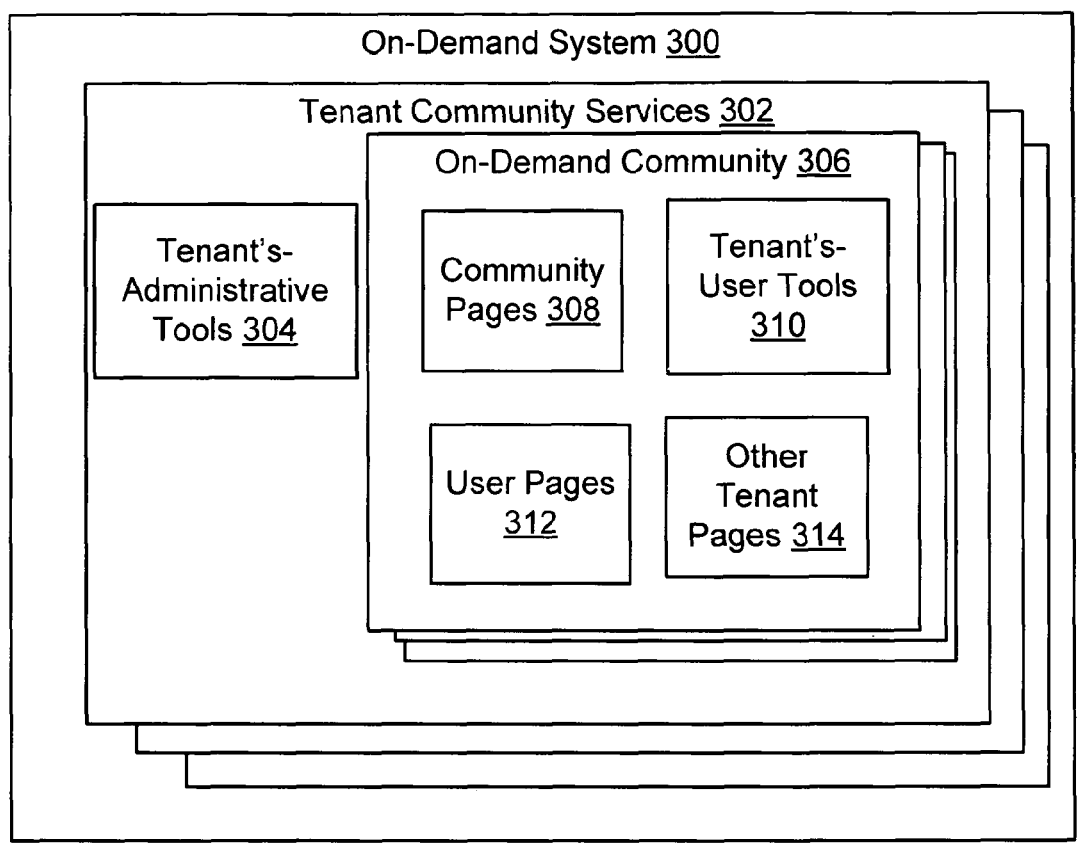
FIG. 3 shows a block diagram of an embodiment of a system for providing a self-grouping of communities.

FIG. 3 shows a block diagram of an embodiment of a system for providing communities on demand, which will be referred to as on-demand system 300. On-demand system 300 may include tenant community service 302, which may include tenant's administrative tools 304 and on-demand communities 306. On-demand communities 306 may include community pages 308, tenant's user tools 310, user pages 312, and other user pages 314. In other embodiments, on-demand system 300 may not have all of the elements listed and/or may have other elements instead of or in addition to those listed.

On-demand system 300 is for creating a system on demand. On-demand system 300 may be one of tenant 1 process through tenant N process 104(FIG. 2). The on-demand communities, may include tools for creating, and may be used by tenants to create on-demand communities. Tenant community services 302 include services that are available to administrators and/or users of the on demand communities, which may include services that facilitate the self-grouping of a community, services for creating self grouping communities on demand, services for managing communities, and/or other services. Tenant community services 302 may include services available to the members of a particular tenant (e.g., employees, customers, and administrators of the tenant). Administrative tools 304 are the tools available to the administrator of a tenant that are associated with self-grouping communities. Administrative tools 304 may be used for creating and/or maintaining on-demand communities. On-demand communities 306 may include self-grouping communities that are created with and/or managed by administrative tools 304. On-demand communities 306 are self grouping communities that were using administrative tools 304. On demand communities 306 may be referred to as self forming communities, because in an embodiment on demand communities 306 facilitates self-forming groups. However, anytime a self forming group is mentioned an embodiment without self forming groups can be substituted and any place on-demand communities 306 is mentioned, a self forming community may be substituted. Community pages 308 may include pages that are available to community members for viewing. Tenant user tools 310 may include tools available to a user that is a member of a tenant. Tenant user tools 310 may include tools for creating a widget and/or for adding a widget to a webpage. Tenant user tools 310 may include tools for creating a an RSS feed and/or for adding a RSS feed to a webpage. User pages 312 may include pages created by a user and/or for a user. User pages 312 may include, among other things, widgets and/or RSS feeds. Other tenant pages 314 may include other pages that may be include in a tenant website.

Figure 4:
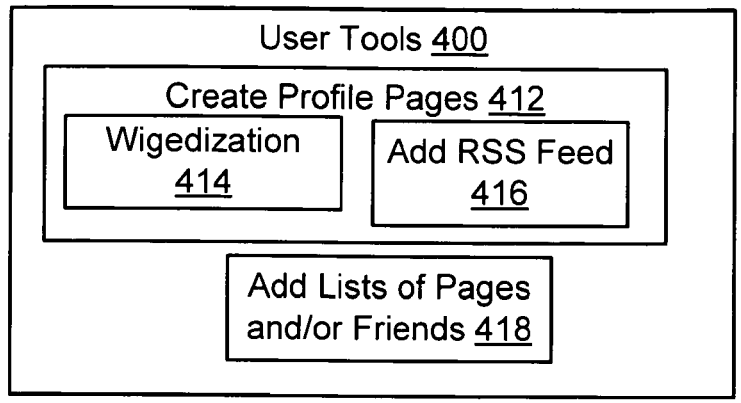
FIG. 4 shows a block diagram of an embodiment of user tools.

FIG. 4 shows a block diagram of an embodiment of user tools 400. User tools 400 may include create profile pages 412, which may include widgetization 414 and add RSS feed 416. User tools 400 may also include add lists 418. In other embodiments, user tools 400 may not have all of the elements listed and/or may have other elements instead of or in addition to those listed.

User tools 400 may be an embodiment of tenant's user tool 310. Create profile pages 412 may be used for creating pages that include a profile of the user. Widgetization 414 may be used for creating widgets and/or adding widgets to webpages. Widgetization 414 cooperates with the community website to encourage users to revisit the site for updates, and encourages the forming of groups. Add RSS feed 416 may be used for creating and/or adding an RSS feed to webpages. Add RSS feeds 416 may also cooperate with the community website to encourage users to revisit the site for updates, and encourages the forming of groups. Add list 418 may be used for adding lists to a webpage, such as a friends list and/or lists of other pages.

Figure 5:
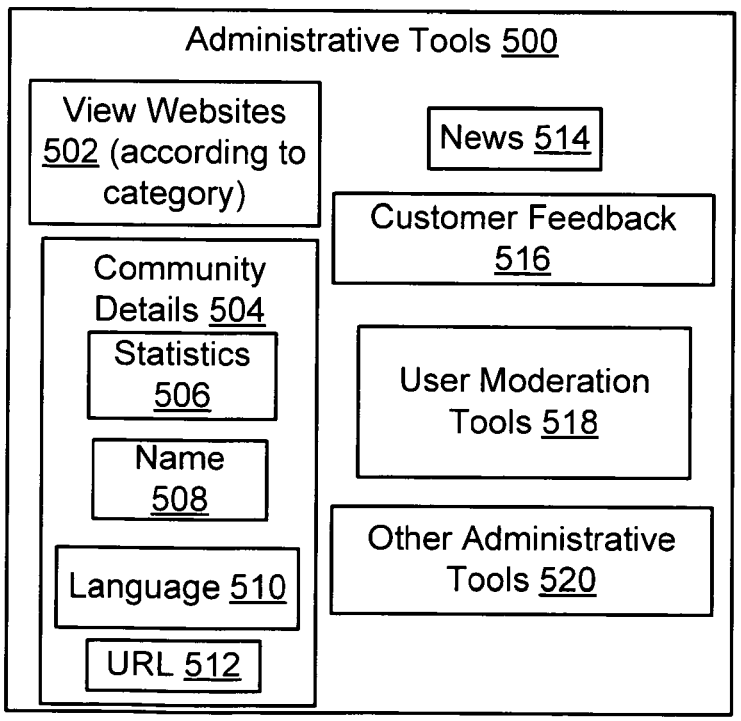
FIG. 5 shows a bock diagram of an embodiment of administrative tools.

FIG. 5 shows a bock diagram of an embodiment of administrative tools 500. Administrative tools 500 may include view websites 502, and community details 504, which may include statistics 506, name 508, language 510, and URL 512. Administrative tools 500 may include news 514, customer feedback 516, user moderation tools 518, and other administrative tools 520. In other embodiments, administrative tools 500 may not have all of the elements listed and/or may have other elements instead of or in addition to those listed.

Administrative tools 500 may be an embodiment of administrative tools 304. View websites 502 allows an administrator to view websites, which may have been created by the administrator. Community details 504 may include information about details of each community. Statistics 506 may include statistics about a community, such has how many members belong to the community. Statistics 506 may include information about groups within a community. Names 508 may include names of people that are member of the community. Language 510 includes the selection of language for the community. URL 512 may include the URL of the community. News 514 may include news about the community. Customer feedback 516 may include feedback form customers. User moderation tools 518 may include tools for moderating disputes between users of the community. Other administrative tools 520 may include other administrative tools.

Figure 6:
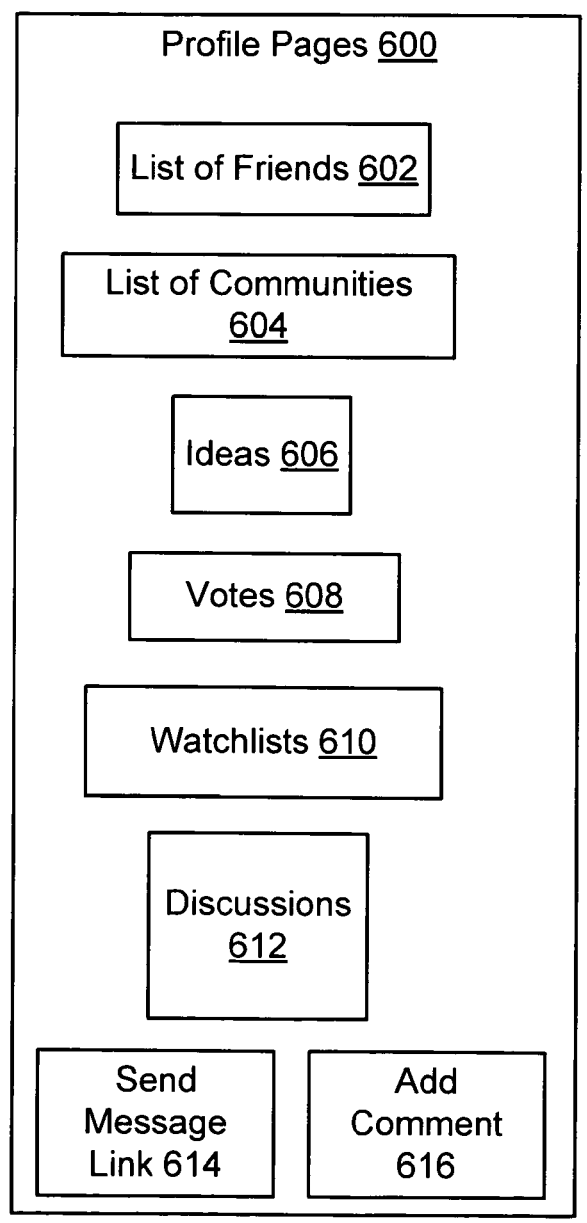
FIG. 6 shows a block diagram of an embodiment of profile.

FIG. 6 shows a block diagram of an embodiment of profile 600. Profile 600 may include list of friends 602, list of communities 604, ideas 606, votes 608, watchlists 610, and discussions 612, send message link 614, and add comment 616. In other embodiments, profile 600 may not have all of the elements listed and/or may have other elements instead of or in addition to those listed.

Profile 600 may include information about the user that created the profile and/or information that interests the user. In an embodiment, any user may add information to profile 600. In another embodiment, only the user to which the profile 600 is dedicated may add information to profile 600. Profile 600 cooperates with the community website to encourage users to revisit the user's site within the community for updates, and encourages the forming of groups. List of friends 602 may include lists of friends of the user. List of communities 604 may include lists of communities to which that user belongs to and/or that the user is allowed to join. Ideas 606 may include ideas of the user. Votes 608 may include votes that were cast by the user. Watchlists 610 may include lists of, and/or links to, ideas about which the user would like to receive updates. Discussion 612 may include discussions in which the user currently participates. Discussion 612 and/or other parts of profile 600 may contain links and/or fields for other users to post and/or send messages to the user associated with profile 600. In particular, the combination of widgets, optionally RSS feeds, and profiles creates a synergy in the communal aspects of the community website, which encourages self forming groups. Send message link 614 may be link on a web page of profile 600 via which a user may send a message to the owner of profile 600. Add comment 616 is a portion of a webpage (e.g., a field) of profile 600 or a link that opens a page via in which a user may add a comment (e.g., a message to the profile owner) to a webpage of profile 616, that any viewer of the profile 600 may see. Send message link 614 and add comment 616 may be tools for promoting discussion that are part of discussion 612 or may be separate from discussion 612.

Figure 7:
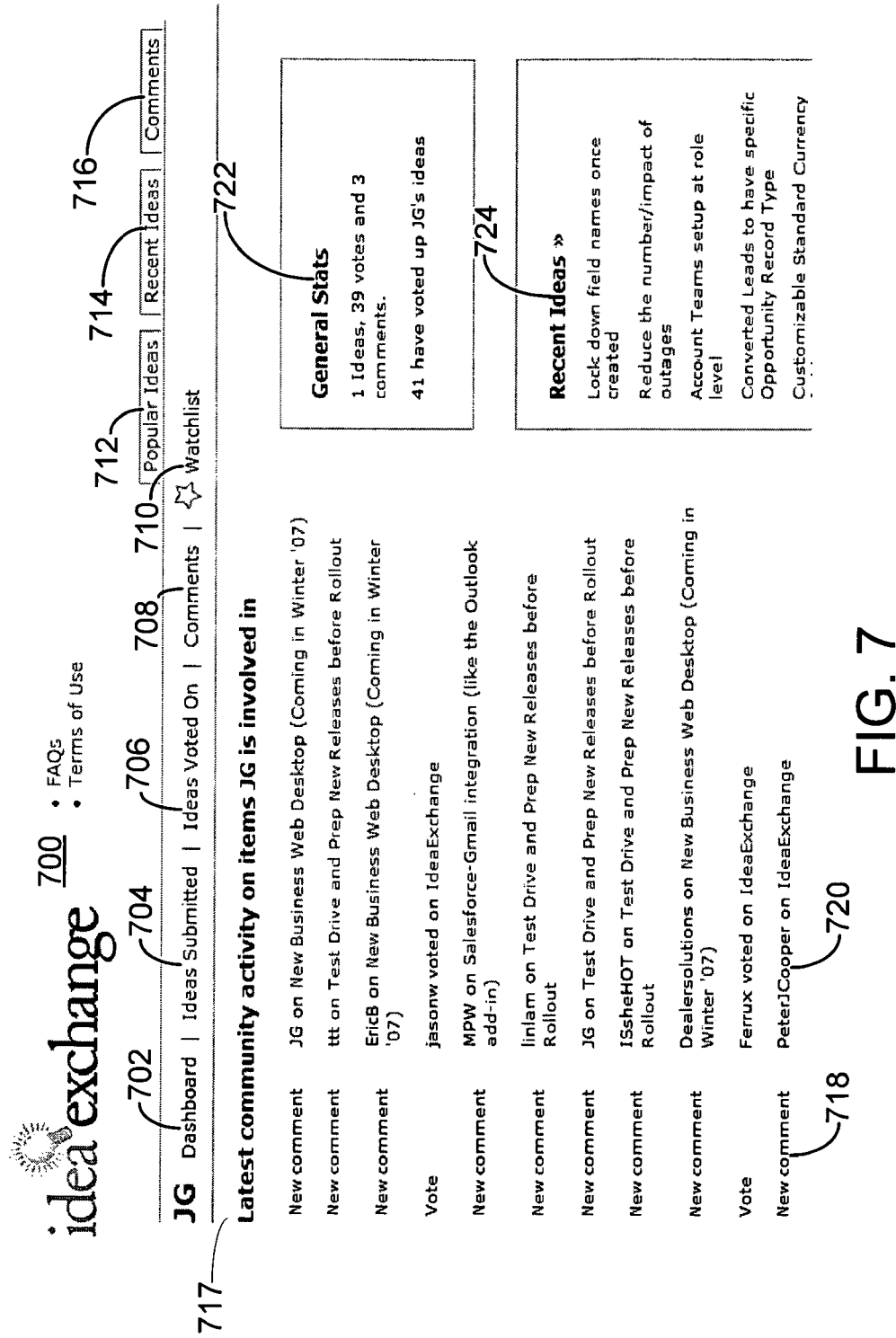
FIG. 7 is a screenshot of an embodiment of a user dashboard.

FIG. 7 is a screenshot of an embodiment of a user dashboard 700. User dashboard 700 may include dashboard tab 702, ideas submitted tab 704, ideas voted on tab 706, comments tab 708, watchlists tab 710, popular ideas tab 712, recent ideas tab 714, comments tab 716, latest community activities 718 having type of activity 718 and description of activity 720, general stats 722, and recent ideas 724. In other embodiments, dashboard 700 may not have all of the elements listed and/or may have other elements instead of or in addition to those listed.

Dashboard 700 contains links for the user to access for managing, maintaining, and/or creating the user's webpages. Dashboard 700 includes information summarizing the status of the user's activities. Dashboard tab 702, when selected (e.g., by clicking once or twice with a mouse, or other input device or by selecting hitting the return key), causes dashboard page 700 to appear. In the screenshot of FIG. 7 dashboard tab 702 is currently selected (which is why dashboard page 700 is displayed in the screenshot of FIG. 7).

Ideas submitted tab 704 causes a webpage to appear that lists ideas that the user submitted, which may also include information about where the idea was submitted and information about the ideas, such as the number of votes the idea received and/or comments about the idea.

Ideas voted on tab 706 causes a webpage to appear that lists ideas that the user voted on, which may also include information about where the idea that voted on is found, such as the number of votes received by, and/or the comments entered about, the idea that the user voted on. received and/or comments about the idea.

Comments tab 708, when selected, in an embodiment, causes a webpage to appear that lists ideas that the user commented on, which may also include the comment made, information about where the idea that the user commented on may be found, such as in which community the idea can be found, the number of votes cast for and/or against the idea commented upon, and/or other comments entered about the idea that the user commented on. In an embodiment, comments tab 708, when selected, causes a webpage to be displayed that lists comments received on profile 600 (e.g., the comments may have been added to profile 600 via add comment 616).

Watchlists tab 710 causes a webpage to appear that lists watchlists that the user has set. The user may set a watch on an idea commented on, an idea voted on, an idea submitted, a profile of another user, and/or ideas posted by another user, for example. Each item for which a watch is set may appear in a watchlist and update to the item may be automatically posted. The updates may include any of a number of activities that occurred recently, such as a change in a vote, and new comment about an idea, and/or a new idea that has been posted relating to the item in the watchlist. For example, if another user is listed in the watchlist, the watch may be set to send an indication that the user being watch performed a new activity and the information about the activity. If the activity is the posting of an idea, an indication that a new idea was posted and a link to the idea may be sent watchlist.

Popular ideas tab 712 may include a link to a webpage that list the most popular ideas that have been posted and/or that the user has posted so far. Recent ideas tab 714 may include a link to a webpage that lists the most recently posted ideas and/or the ideas of the user that were posted most recently. Comments tab 716 may perform a similar or different function as comment tab 708, and, when selected, may cause a page to be displayed that has links to comments that the user posted and/or comments about ideas that the user posted, links to comments about ideas that the user voted upon, and/or links to comments about ideas that the user commented upon, for example.

Latest community activities 717 may include (or may be) a list of the latest activities that occurred at one or more communities. Activity type 718 lists the types of activities of the activities a that recently occurred. Activity types may include the posting of a new comment (which may be referred to as "new comment"), a change in a vote (which may be referred to as "vote"), the posting of an idea, and/or updating a profile, for example. Description of activity 720 lists a description of the activities included in list community activities 718. In an embodiment, each description of description of activity 720 may include a name of the user and a name of an idea in which the activity was conducted. For example, the description of a vote may be "Ferrux voted on Idea exchange," where "Ferrux" is the name of the user that cast the vote and "Idea Exchange" may be a name of the idea that was voted on. Another example of a description may be "JG on Test Drive and Prep Release before roll out," where JG may be the name of the user that posted the new comment and "Test Drive and Prep Release before Roll Out" may be a title of the idea that was commented upon.

General stats 722 may be a field (e.g., a box) in which statistics related to a particular community may be listed. For example, general stats 722 may include information about a a particular community. For example, general stats 722 may include the number of votes received, comment posted, ideas posted during a particular period of time, and/or the number of votes cast for and/or against the ideas that the user has posted.

Recent ideas 724 may include a field that list ideas that were recently posted. Optionally, recent ideas 724 may include a smaller portion of the information about recently posted ideas that are displayed upon selecting recent ideas tab 714.

FIGS. 8A-D describe information relevant to widgets and RSS feeds.

FIG. 8A shows an example of an idea 800 having widget 802. Widget 802 may have been place by a user into idea 800. In other embodiments, idea 800 may not have all of the elements listed and/or may have other elements instead of or in addition to those listed.

FIG. 8B shows an example of another embodiment of a posting of an idea 810 having vote 812, comment field 814, posted-by field 816, related-to field 818, and date field 819. In other embodiments, idea 810 may not have all of the elements listed and/or may have other elements instead of or in addition to those listed.

Idea 810 may be an idea posted by a user, such as an end user or an administrator. Vote 812 is link that initiates casting a vote and also gives a count of the total number of votes cast for or against the idea. Comment field 814 lists the number of comments that have been posted about the idea. In an embodiment, comment field 814 may also be a link to a page for viewing the comments and/or posting another comment. Posted-by field 816 is a field that lists the user that posted the idea. Related-to field 818 is a field that lists a project, discussion topic, company, division of a company, and/or campaign to which the idea is related. Date field 819 lists the date that the idea was posted.

Figure 8C:
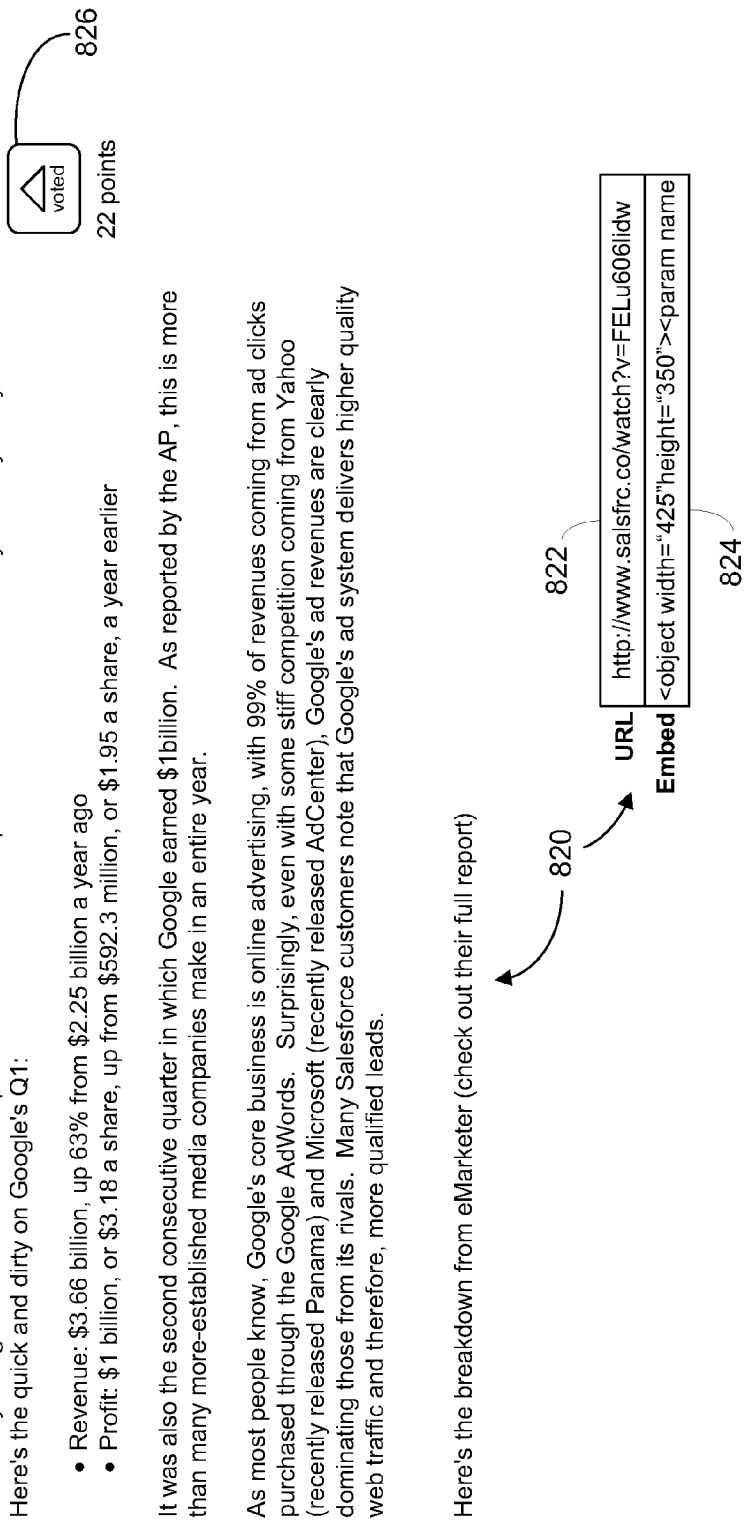
FIG. 8C shows an example of screenshot of a portion of a webpage having a widget.

FIG. 8C shows an example of screenshot of a portion of a webpage 820 having a widget. Portion of webpage 820 includes URL field 822, code snippet field 824, and widget 826. In other embodiments, portion of webpage 820 may not have all of the elements listed and/or may have other elements instead of or in addition to those listed.

Portion of webpage 820 is a portion of a webpage in which a snippet of code is embedded. URL field 822 is a field on a webpage into which a URL of a snippet of code is located. Code snippet field 824 is a field on a webpage into which a snippet of code may be inserted. Code snippet field 824 contains code that creates a widget. As a result of pasting the code snippet into code snippet field 824, a widget appears. Widget 826 is the widget created by code snippet 824. By being able to paste a code snippet into a portion of the webpage, where the code snippet has already been proven to function properly, the coding for an end user is simplified to just copying and pasting the code snippet. The widgets may contain content that changes with time and/or responds to a viewer's activities. The user may be given access to widgets that receive votes, widgets that cause recent ideas to be displayed, widgets that display comments, and widgets that cause popular ideas to be displayed. Widgets may be used to snip entire ideas and cause the idea to be displayed in a location at which the widget is pasted. Widgets may be added to templates for publishing material, such as templates for webpages.

Figure 8D:
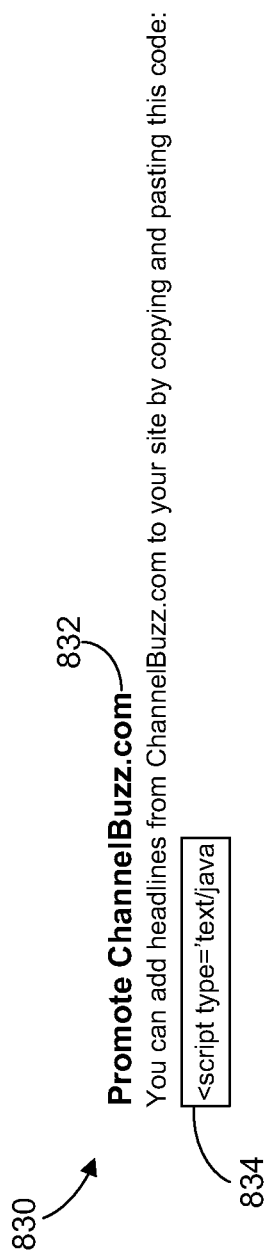
FIG. 8D shows an example of screenshot of a portion of a webpage 830 for creating a widget. Portion of webpage 830 includes description 832 and code snippet 834.

FIG. 8D shows an example of screenshot of a portion of a webpage 830 for creating a widget. Portion of webpage 830 includes description 832 and code snippet 834. In other embodiments, portion of webpage 830 may not have all of the elements listed and/or may have other elements instead of or in addition to those listed.

Portion of webpage 830 is a portion of a webpage that a user may access for creating a widget. Description 832 describes the widget that may be created with the connects of portion of webpage 830. Description 832 describes the widget or type of widget that is created. Code snippet 834 is a portion of code that may be copied and pasted into a webpage to create the widget described. Code snippet 834 may be copied and pasted into the code of another webpage to create the widget. Code snippet 834 is the actual code for creating the widget.

Figure 9:
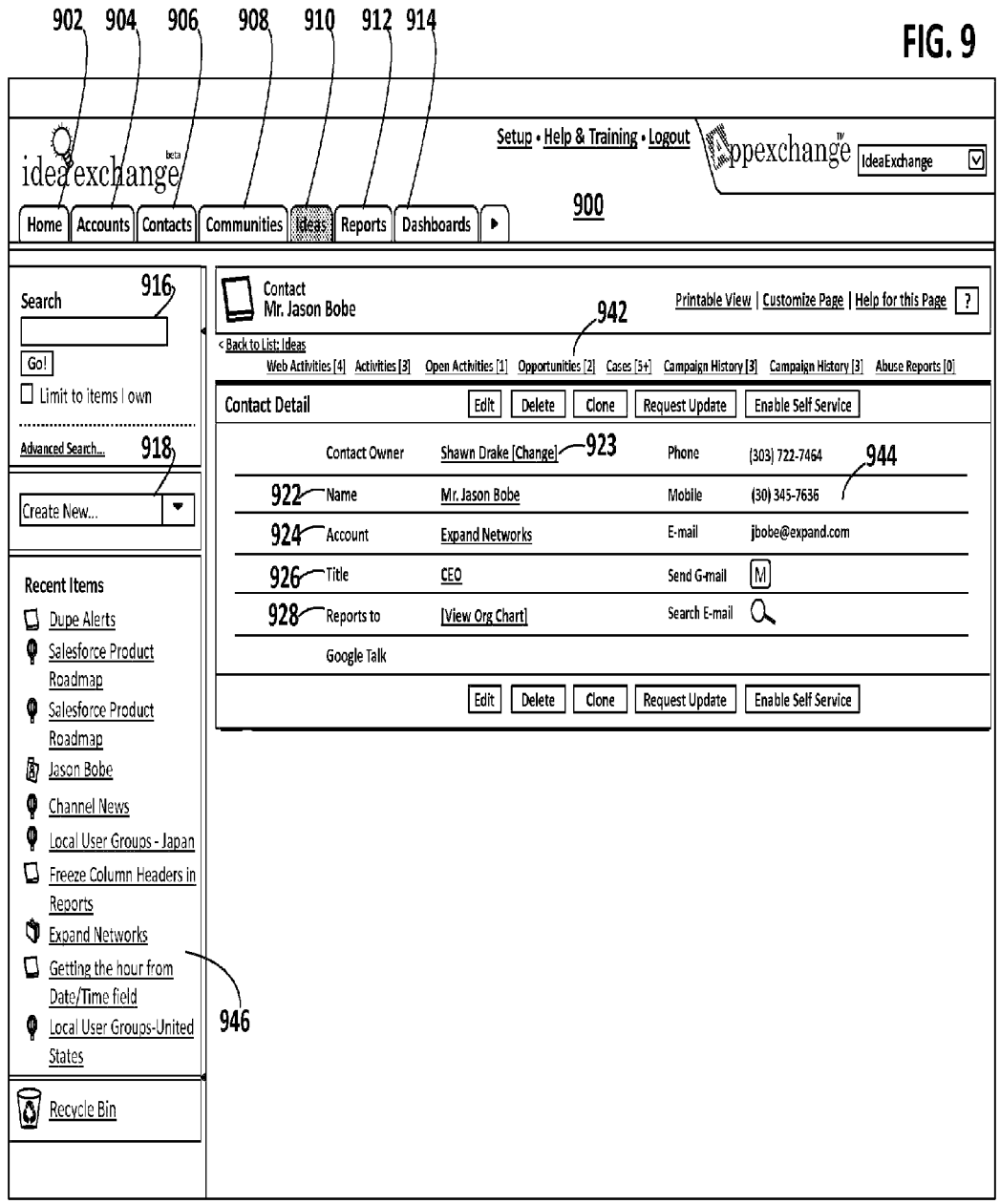
FIG. 9 is a screenshot of an example of a contacts page.

FIG. 9 is a screenshot of an example of a contacts page 900. Contacts page 900 may include home tab 902, accounts tab 904, contacts tab 906, communities tab 908, ideas tab 908, reports tab 912, dashboard tab 914, search field 916, task menu 918, and contact details 920, which may include contact owner 922, contact name 923, account 924, title 926, reports-to 928, edit 932, delete 934, clone 936, request update 938, enable self-service 940, contact information 944, links 942, contact information 944, and recent items 946. Contacts page 900 may also include community profile 947, which may include alias 948, profession 950, location 952, profile 954, myblog 956, my company 958, articles 960, props 962, votes 962, votes 964, and comments 966. Contacts page 900 may also include additional information 967, which may include web activities 968, which may include actions 970 and web activities 981, article 974, edit 976, delete 978, clone 980, request update 982, enable self-service 984, new 986, created date 988, and community 990. Contacts page 900 may also include activity history 991, which may include local call 992, mail merge 994, send an e-mail 996, request update 998, view all 902.1, action 904.1, subject 906.1, related-to 908.1, due date 910.1, assigned-to 912.1, and last modified tab 914.1. Contacts page 900 may also include open activities 915.1, which may include new task 916.1 and new event 918.1. In other embodiments, contacts page 900 may not have all of the elements listed and/or may have other elements instead of or in addition to those listed.

Contacts page 900 my include links that facilitate keeping track of contacts. Home tab 902 may include a link, which when selected, brings a user to the home page of the on-demand community. Accounts tab 904 brings the user to a page that includes account information, which may include information about the company that is tenant of the multi-tenant database. If the user is an administrator, the account information may include information about all users and/or about the tenant with which the community website is associated. Contacts tab 906 may include a link, which when selected, brings a user to a page that includes information related to the user's contacts. The contacts may be those users that the owner of contact page 900 (e.g., an administrator or other employees of the tenant) communicates with at a particular company. A group of users that list one another as contacts may be said to form a self-formed group. In FIG. 9 contacts tab 906 is already selected and consequently contact page 900 is presented. Communities tab 908 may include a link, which when selected, brings a user to a page that contains information about on-demand communities to which that the user is authorized to view, which may be different depending on the user's authorized level of access, which in turn may depend on whether the user is an administrator, other employee of the tenant, customer of the tenant, or another end user. Ideas tab 908 may include a link, which when selected, brings a user to a page that contains information about the ideas posted on webpages of the on-demand community. For example, the information about the ideas may include a complete listing of ideas posted. The ideas may be grouped into categories, and the information about the ideas may include links that cause every idea in a particular category to be listed, the most recent ideas to be listed, the most popular ideas to be listed, comments about ideas to be listed, and/or votes for and/or against a particular ideas to be displayed. Reports tab 912 may include a link, which when selected, brings a user to a page that contains information about reports to be displayed, such as a list of available reports and/or links for generating reports. The reports may include statistics and/or other information about users, ideas, comments, votes, and/or the performance of the company of the tenant hosting the on-demand community. Dashboard tab 914 may include a link, which when selected, brings a user to a page that contains information and/or links that relate to managing the community, if the user is an administrator. Dashboard tab 914 may include a link, which when selected, brings a user to a page that contains information and/or links that relate to managing the webpages of the end user, if the user is an end user. For example, if the user is an end user, the dashboard tab 914, when selected may being the user to dashboard 700 (FIG. 7).

Search field 916 may be used for searching the on-demand community for keywords, other users, comments, accounts, reports, and/or ideas. Task menu 918 may be a pull down menu for initiating one or more tasks that the user is authorized to do. Task menu 918 may include a task for creating a new community and/or adding users to a community. Contact details 920 is a section of contact page 900 that includes details about one or more contacts. Contact owner 922 may be the name of the owner of the contact. For example, the owner of the contact may be the owner or CEO of the company that employs the contact. Contact name 923 may list the name of a contact. Account 924 is the name of the account associated with the contact owner, which may be the company associated with (e.g., that employs) the contact. Title 926 may be the title of the contact (e.g., CEO, vice president, staff engineer, or other title). Reports-to 928 may list the person and/or entity to who the contact reports, such as the boss, superior, or supervisor of the contact.

Edit 932 allows the user to edit the contact information. Delete 934 allows the user to delete the contact. Clone 936 causes a duplicate record of the current contact to be created, which is useful for creating a new contact that has similar contact information as the current contact. For example, if new contact works for the same company as a contact already entered, it may be efficient to clone the contact entered and then edit the information of the clone. Request update 938 may send a request to the contact or to a sever associated with the contact for an update to the information about the contact. Enable self-service 940 may allow the contact to edit the contact information. Links 942 may include links for viewing other information, such as a link for viewing web activities, history of activities, open activities, opportunities, cases, campaign history, and/or other links. Opportunities may be sales leads. Cases may track the process of a project that is underway and include information such as deadlines, payments, and goods delivered. Web activities may allow the user to view activities occurring on a network, such as the number of people that visit a community. History of activities may allow the user to view a history of all of their activities (not just the web activities). In an embodiment, history of activities may allow the user to view a history of all activities associated with the on-demand community. In one embodiment, the user may only view all activities associated with the community if the user is an administrator. In another embodiment others, possibly any community member may view all activities. Open activities may include information about activities that are in progress. Cases may include current clients and activities associated with the current clients. Campaign history may include information about a campaign, such as marketing goals and progress towards reaching those marketing goals.

Contact information 944 includes the information for contacting the contact, such as an email address, telephone number, mobile phone number, instant messaging address, another contact address, and/or other contact information. Recent items 946 may include a listing of items that were recently accessed, such as a contact, information about the company hosting the multi tenant database.

Community profile 947 may be a portion of a webpage that includes information about an on-demand community created by the user and associated with the contact. Alias 948 may include a name for the community. Profession 950 may a profession associated with the on-demand community. Location 952 may be a location of the members of the community and/or of the host of the community. Profile 954 may include a profile of the contact, such as a Linkedin profile. Myblog 956 may be a blog of the user that owns contacts page 900 and is associated with the community. My company 958 may be a company associated with the on-demand community. Articles 960 may be a list of ideas of members of the community. Props 962 may include article, images, and/or applications that the user uploads to the user's profile and/or other webpages. Votes 964 may include the votes cast for and/or against each idea posted. Comments 966 may include comments about ideas posted by the users. Additional information 967 includes information about communities. Web activities 968 may include a information about web activities that the contact may has performed, such as posting an idea, voting and/or posting a comment about an idea. Actions 970 may include editing or deleting a web activity. Web activities 972 may be a list of web activities. Article 974 lists the article for to the vote, comment, or idea is related.

Edit 976 allows the user to edit the other information. Delete 978 allows the user to delete a record (e.g., a line or a web activity) from the other information. Clone 980 causes a duplicate record of the current activity to be created, which is useful for creating a new line of other information that has similar information as the line of other information. For example, if a newly performed web activity is similar to a previously performed web activity, it may be efficient to clone the previously performed web activity that is already recorded and then edit the information and/or web activity that was cloned, as the web activity is being performed, for example. Request update 982 may send a request to the contact or to a sever associated with the contact for an update to the information other information about the contact. Enable self-service 984 may allow the contact to edit the other information. New 986 allows the user to add or initiates the adding of another web activity. Created date 988 is the date that the record of the web activity was created. Community 990 is the community associated with the corresponding line of web activity 972.

Activity history 991 may include a log of activities of the contact. Log a call 992 may record information about a previously unrecorded phone call. Mail merge 994 may merge an article or other information with an e-mail. For example, mail merge 994 may be useful in uploading the text of an idea into the text of an e-mail. Send an e-mail 996 may initiate sending an email from the current user to the current contact. Request update 998 may request updates from the contact for the contact's activity history. View all 902.1 may cause all activity of a contact or of all contact to be viewed. Action 904.1 are actions that the user may perform on the items recorded in activity history 991, such as editing or deleting the item. Subject 906.1 is the subject of an activity, such as the same of a task. Related-to 908.1 is the company to which the task or other activity of subject 906.1 is related. Due date 910.1 is the date at which it is desired to complete the task. Assigned-to 912.1 is the person, group, or other entity to which the task was assigned. Last modified tab 914.1 is the last date at which the information about the activity was modified. Open activities 915.1 are activities that are currently being created or activities for which the information is currently being modified. New task 916.1 opens a webpage that initiates establishing a new tasks and/or entering information about a previously unrecorded or otherwise new task. New event 918.1 initiates a new event (e.g., a users group meeting), a project, or the entry of information about a new project or event. Each project may contain many tasks.

FIG. 10 shows a screenshot of an example of a community page 1000, showing a metrics view. Community page 1000 includes home tab 902, accounts tab 904, contacts tab 906, communities tab 908, ideas tab 908, reports tab 912, dashboard tab 914, search field 916, task menu 918, and recent items 946. Community page may also include community metrics view 1001, view selection 1002, actions 1003, community name 1004, language 1006, page views 1008, registered users 1010, ideas 1012, votes 1014, and comments 116. In other embodiments, community page 1000 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above.

Metrics view 1001 is one or more webpages that display metrics about the community. A metric of the community is a measure of the size, user interest, and/or amount of activity associated with the community. View selection 1002 allows the user to select a view of community page 1000. Currently the view selected is community metrics, and consequently community metrics view 1001 is displayed in FIG. 10. However, there may be other views. Actions 1003 are links that initiate actions to perform on the communities listed, such as deleting and/or editing the information listed about a community and/or the parameters of the community. Community name 1004 is a list of the names of the communities. Language 1006 list the language of each community. Page views 1008 lists the number of webpage views that may be viewed within a particular community. Registered users 1010 lists the number of users that have registered for a given community. Ideas 1012 lists the number of ideas that have been posted within a particular community. Votes 1014 lists the total number of votes cast within a community. Comments 1016 lists the total number of comments posted within a community.

Figure 11:
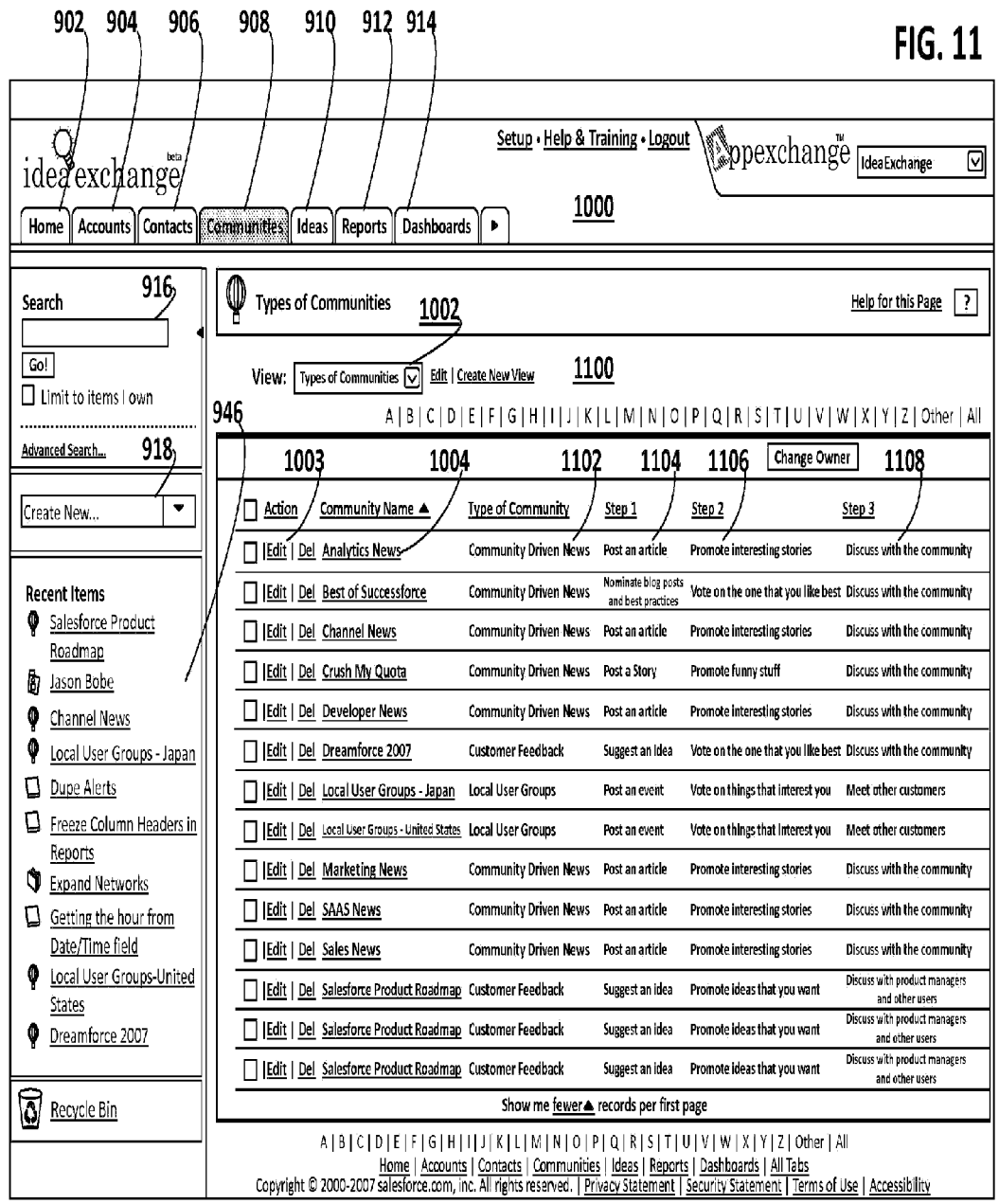
FIG. 11 shows a screenshot of an example of a community page showing a URL view.

FIG. 11 shows a screenshot of an example of a community page 1000, showing a types-of-community view 1100. Community page 1000 includes home tab 902, accounts tab 904, contacts tab 906, communities tab 908, ideas tab 908, reports tab 912, dashboard tab 914, search field 916, task menu 918, and recent items 946. Community page 1000 may also include types-of-community view 1100 having view selection 1002, actions 1003, community name 1004, types of community 1102, step-1 1104 step-2 1106, and step-3 1108. In other embodiments, types-of-community view 1100 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above. Community page 1000, view selection 1002, actions 1003, and community name 1004 were described in conjunction with FIG. 10, above.

Types-of-community view 1100 lists information about the types of communities that currently exist and/or that a user is a member of. Types of community 1102 lists different types of communities, such as customer feed back (where customers post their thoughts and ideas about particular products, suggest improvements to products, suggest new products, and/or ideas about product suggestions, for example), community driven news (where users post news that they have heard, such as news about a particular industry, product, or product line, for example), and local users group (where users discuss how to use the product and/or overcome difficulties, for example). Step-1 1104 step-2 1106, and step-3 1108 are a delineation of steps that the community is intended to accomplish, which thereby further define the community. For example, for a community that has a type of community new, step-1 1104 may be post an article, step-2 1106 may be promote interesting stories, and step-3 1108 may be discuss with community. As another example, for a community that has a type of community new, step-1 1104 may be nominate a posting on a blog, step-2 1106 may be vote on one of the blog posts nominated, and step-3 1108 may be discuss with community. As another example, for a community that has a type of local users group, step-1 1104 may be post an event, step-2 1106 may be vote on things that the users are interested in, and step-3 1108 may be meet other users.

Figure 12:
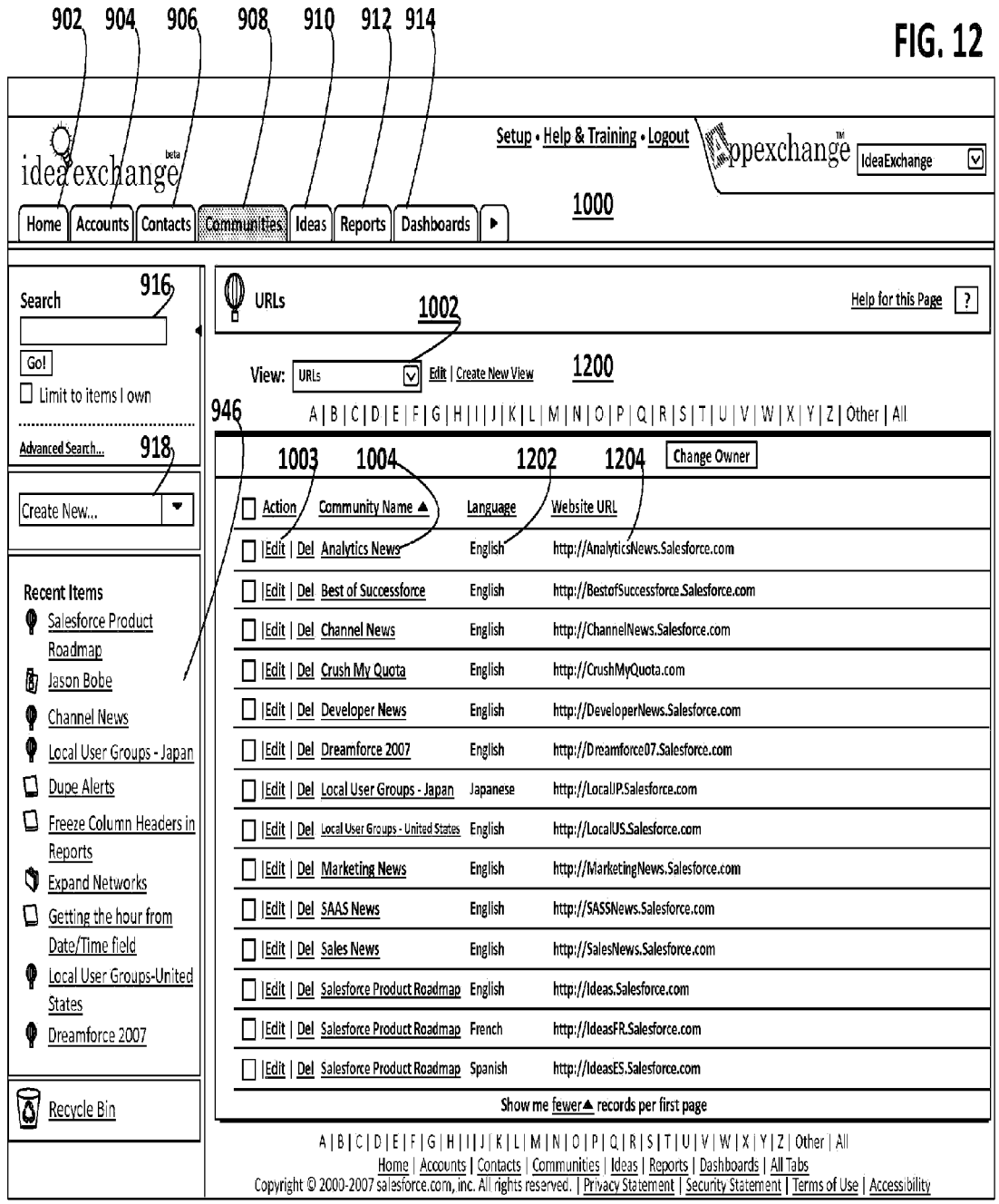
FIG. 12 shows a screenshot of an example of a community page, showing a URL view.

FIG. 12 shows a screenshot of an example of a community page 1000, showing a URL view 1200. Community page 1000 includes home tab 902, accounts tab 904, contacts tab 906, communities tab 908, ideas tab 908, reports tab 912, dashboard tab 914, search field 916, task menu 918, and recent items 946. Community page 1000 may also include URL view 1200 having view selection 1002, actions 1003, community name 1004, language 1202, and URL 1204. In other embodiments, URL view 1200 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above. Community page 1000, view selection 1002, actions 1003, and community name 1004 were described in conjunction with FIG. 10, above.

URL View 1200 provides information about URLs of communities. Language 1202 specifies the language associated with the community, which may be the language in which most of the community members are expected to post information, may be the language in which the administrator posts information, and/or may be the language in which the static data (the data that is not editable by the users) is posted. URL 1204 may be the URL of the home pages and/or the log-in pages of the community named by community name 1004.

Figure 13:
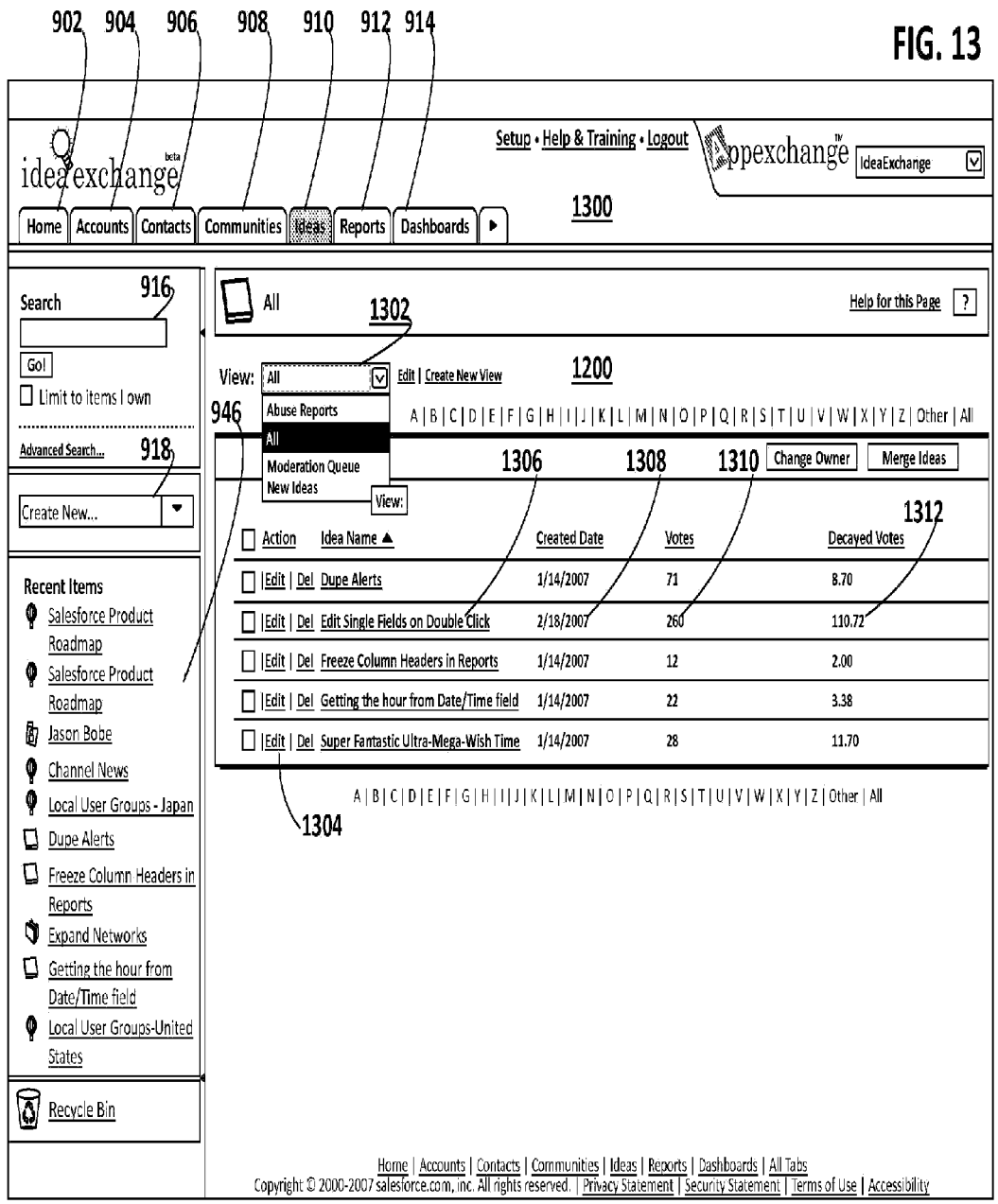
FIG. 13 shows a screenshot of an example of an ideas page.

FIG. 13 shows a screenshot of an example of an ideas page 1300. Ideas page 1300 includes home tab 902, accounts tab 904, contacts tab 906, communities tab 908, ideas tab 908, reports tab 912, dashboard tab 914, search field 916, task menu 918, and recent items 946. Ideas page 1300 may also include view 1302, actions 1304, idea name 1306, idea name 1308, votes 1310, and decayed votes 1312. In other embodiments, ideas page 1300 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above. View selection 1002, actions 1003, and community name 1004 were described in conjunction with FIG. 10, above.

Idea page 1300 displays a list of ideas and information about the ideas. View 1302 allows the user to select different views of the ideas, which may be different categories of ideas, such as new ideas, which are the ideas that were posted after a certain date, popular ideas, which are ideas that have received more than a certain threshold of votes, abuse, which are ideas that relate to handling abuse of the community webpages or of other products and/or services, and/or mediation queue, which are ideas that relate to the queue of disputes among community members that the administrator will moderate. Currently, the view that is selected in "All," which displays all ideas that were posted. Actions 1304 are actions that may be performed to the idea, such as edit or delete the idea. Idea name 1308 lists the names of the ideas posted. Created date 1308 is the date that the idea was created and/or posted. Votes 1310 is the number of votes that an idea received. Decayed votes 1312 is a score in which different votes are weighted differently. The score may give lower weights to older votes and/or may weight votes according to the person or entity casting the vote (a more highly valued customer may be given a vote with a greater weight than a less valued customer).

Figure 14:
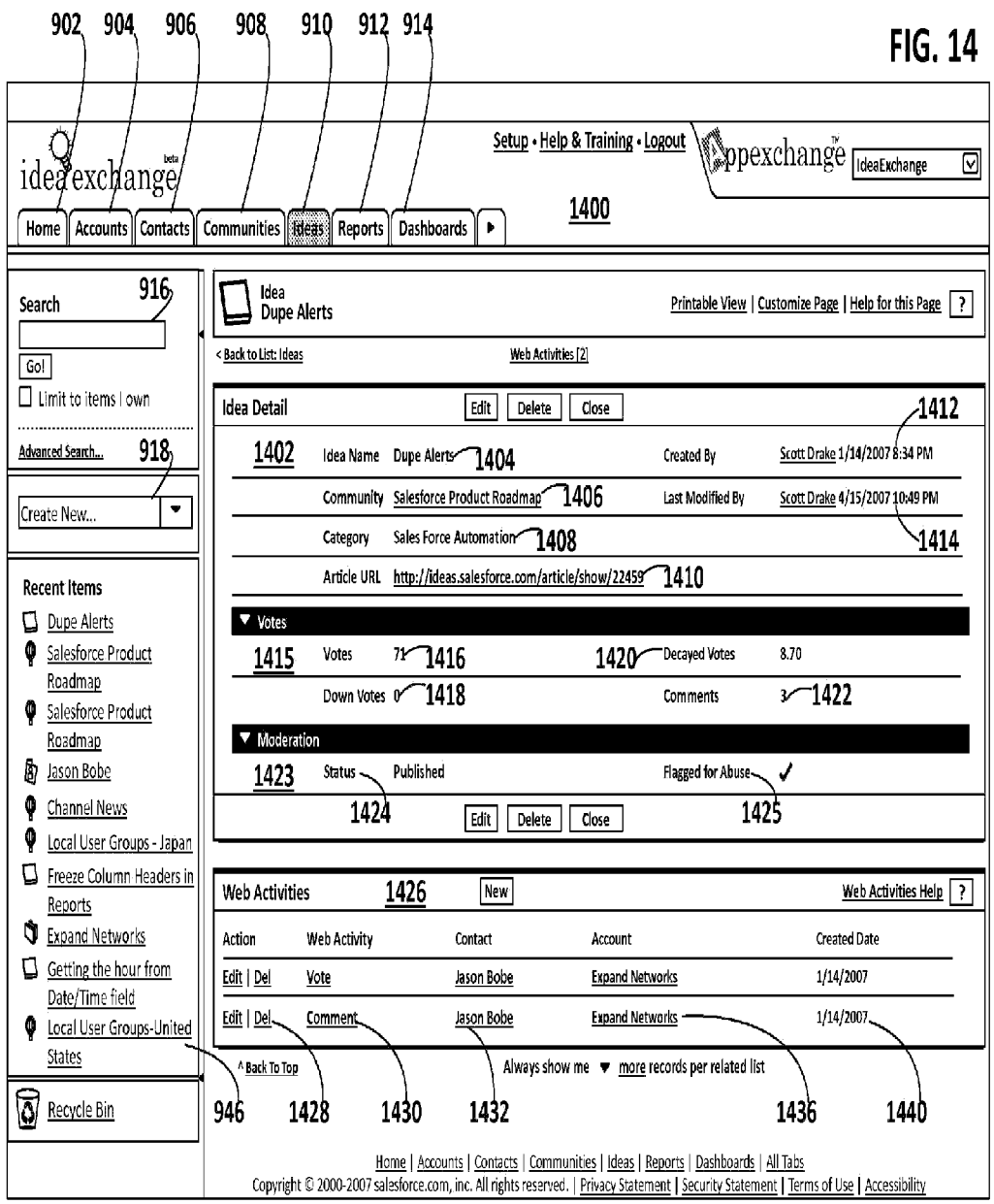
FIG. 14 shows a screenshot of an example of an idea-details view.

FIG. 14 shows a screenshot of an example of an idea-details view 1400. Idea-details view 1400 includes home tab 902, accounts tab 904, contacts tab 906, communities tab 908, ideas tab 908, reports tab 912, dashboard tab 914, search field 916, task menu 918, and recent items 946. Idea-details view 1400 may include idea details 1402, idea name 1404, community 1406, category 1408, URL 1410, created by 1412, and last modified by 1414. Idea-details view 1400 may include votes section 1415, which may include votes 1416, down votes 1418, decayed votes 1420, and comments 1422. Idea-details view 1400 may include moderation 1423, which may include status 1422 and flag 1425. Idea-details view 1400 may include web activity 1426, which may include actions 1428, web activity 1430, contact 1432, account 1434, and date 1436. In other embodiments, idea-details view 1300 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above.

Idea details 1402 may be a section of idea-details view 1400 that describes details of the idea. Idea name 1404 may be the name of the current idea. Community 1406 may be the community within which the idea was posted. Category 1408 is a category within which the idea was classified. URL 1410 is a URL at which the idea may be found. Created by 1412 is the name of the person that created the idea. Last modified by 1414 is the name of the person that last modified the idea. In an embodiment, after the idea is created, the value of last modified by 1414 is the same as created by 1412 until another person modifies the idea. Votes section 1415 may include information related to votes that were cast in relation to the current idea. Votes 1416 is the actual number of votes that were cast for the idea. Down votes 1418 is the number of votes that were cast against the idea. Decayed votes 1420 is the score of the weighted votes, which was discussed above in conjunction with decayed votes 1312 (FIG. 13). Comments 1422 are the number of comments about the current idea. Moderation 1423 is a section of idea-details view 1400 that includes information about any moderation activity that may have occurred in conjunction with the current idea. Status 1422 gives the status of the idea. Some examples of possible values for status 1422 are published, deleted, and unpublished. Flag 1425 is a flag which may be on or off depending upon whether an abuse or an activity that is suspected of being an abuse has occurred. Web activity 1426 is a section of idea-details view 1400 that gives information about web activity that occurred in conjunction with the current idea. Actions 1428 may initiate the performance of actions that may be performed on the idea, such as editing or deleting the idea. Web activity 1430 may list types of web activity that may have occurred in conjunction with the current idea, such as a vote being cast for or against the idea and/or a comment being posted. Contact 1432 may list the name of the person that that is to be contacted about an activity, such as a web activity, which may be the person that performed the web activity. Account 1434 may list the account with which the person named in contact 1432 is associated, such as the name of the company and/or division of a company for which the contact works. Date 1436 is the date on which the web activity associated with the current idea occurred.

Figure 15:
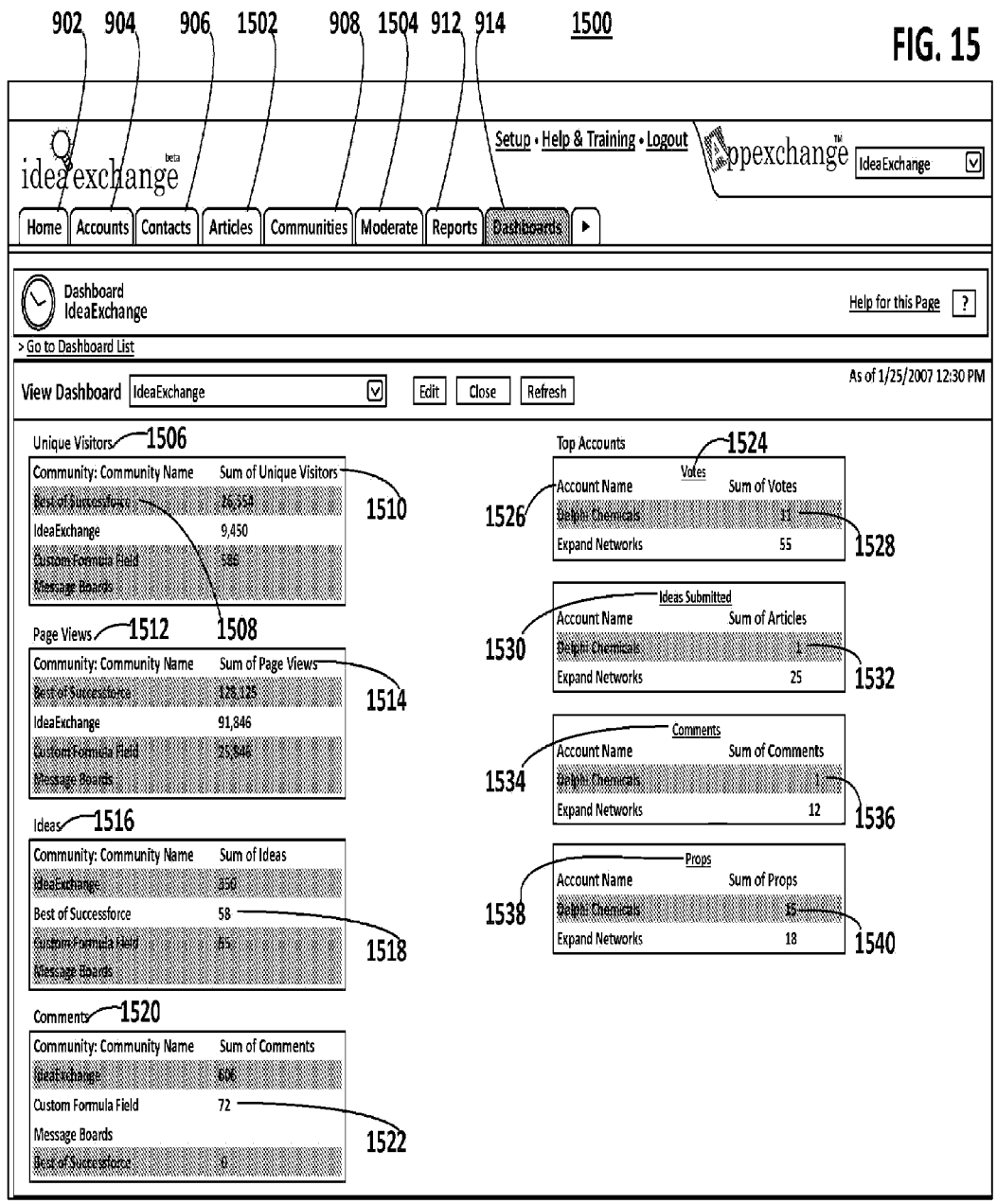
FIG. 15 shows a screenshot of an example of a dashboard.

FIG. 15 shows a screenshot of an example of a dashboard 1500. Dashboard 1500 includes home tab 902, accounts tab 904, contacts tab 906, communities tab 908, ideas tab 908, reports tab 912, dashboard tab 914, search field 916, task menu 918, and recent items 946. Dashboard 1500 may include articles tab 1502, moderate tab 1504, unique visitors 1506, community name column 1508, sum of unique visitors 1510, page views 1512, sum of page views 1514, ideas 1516, sum of ideas 1518, comments 1520, sum of comments 1522, votes 1524, accounts column 1526, sum of votes 1528, ideas submitted 1530, sum of ideas 1532, comments 1534, sum of comments 1536, props 1538, sum of props 1540. In other embodiments, dashboard 1500 may not have all of the elements listed and/or may have other elements instead of or in addition to those listed.

Home tab 902, accounts tab 904, contacts tab 906, communities tab 908, ideas tab 908, reports tab 912, dashboard tab 914, search field 916, task menu 918, and recent items 946 were described in conjunction with FIG. 9, above.

Dashboard 1500 shows a summary of information associated with a tenant. Dashboard 1500 may be part of a different embodiment than FIGS. 9-14. In an embodiment, dashboard 1500 has the same set of tabs as the pages shown in FIGS. 9-14. In another embodiment, the pages of FIGS. 9-14 have the same set of tabs as illustrated in FIG. 15 on dashboard 1500. Articles tab 1502, when selected brings a user to a page for viewing information about articles. In this specification, the words "article" and "idea" are used interchangeably and one may be substituted for another to obtain different embodiments. Moderate tab 1504, when selected brings a user to a page where information about ideas and/or web activity that is being moderated is presented.

Unique visitors 1506 is a section of dashboard 1500 that display the number of unique visitors that visit each community. Community name column 1508 is a column that lists the names of communities about which information is presented in the next column. Community name column extends down through each of the sections below unique visitors. Sum of unique visitors 1510 is the sum of the unique visitors for each community listed in community name column 1508 (in this specification, the phrase total number may be substituted for the word sum where ever the word sum appears). Page views 1512 is a section of dashboard 1500 that lists the number of page views that are included in each community. Sum of page views 1514 lists the sum of the page views for the corresponding community named in the same row in community name column 1508. Ideas 1516 is a section of dashboard 1500 that lists the number of ideas that have been posted in each community. Sum of ideas 1518 lists the sum of the ideas posted in the corresponding community named in the same row in community name column 1508. Comments 1520 is a section of dashboard 1500 that lists the number of comments that have been posted in each community. Sum of comments 1522 lists the sum of the comments posted in the corresponding community named in the same row in community name column 1508.

Votes 1524 is a section of dashboard 1500 that lists the number of votes that have been cast in each account. Accounts column 1526 lists names of accounts that are owned by the tenant and with which the communities are associated. Accounts column 1526 is a column that lists the names of accounts about which information is presented in the next column. Accounts column 1526 extends down through each of the sections below votes 1524. Sum of votes 1528 lists the sum of the votes cast in the corresponding account named in the same row in account column 1526. Ideas submitted 1530 is a section of dashboard 1500 that lists the number of ideas that have been posted in each account. Sum of articles 1532 lists the sum of the articles posted in the corresponding accounts named in the same row in account column 1526. Comments 1534 is a section of dashboard 1500 that lists the number of comments that have been posted in each account. Sum of comments 1536 lists the sum of the comments posted in the corresponding accounts named in the same row in account column 1526. Props 1538 is a section of dashboard 1500 that lists the number of pops that have been posted in each account. Sum of props 1540 lists the sum of the props posted in the corresponding accounts named in the same row in account column 1526.

Server-Side Method of Creating a Community On-Demand

Figure 16:
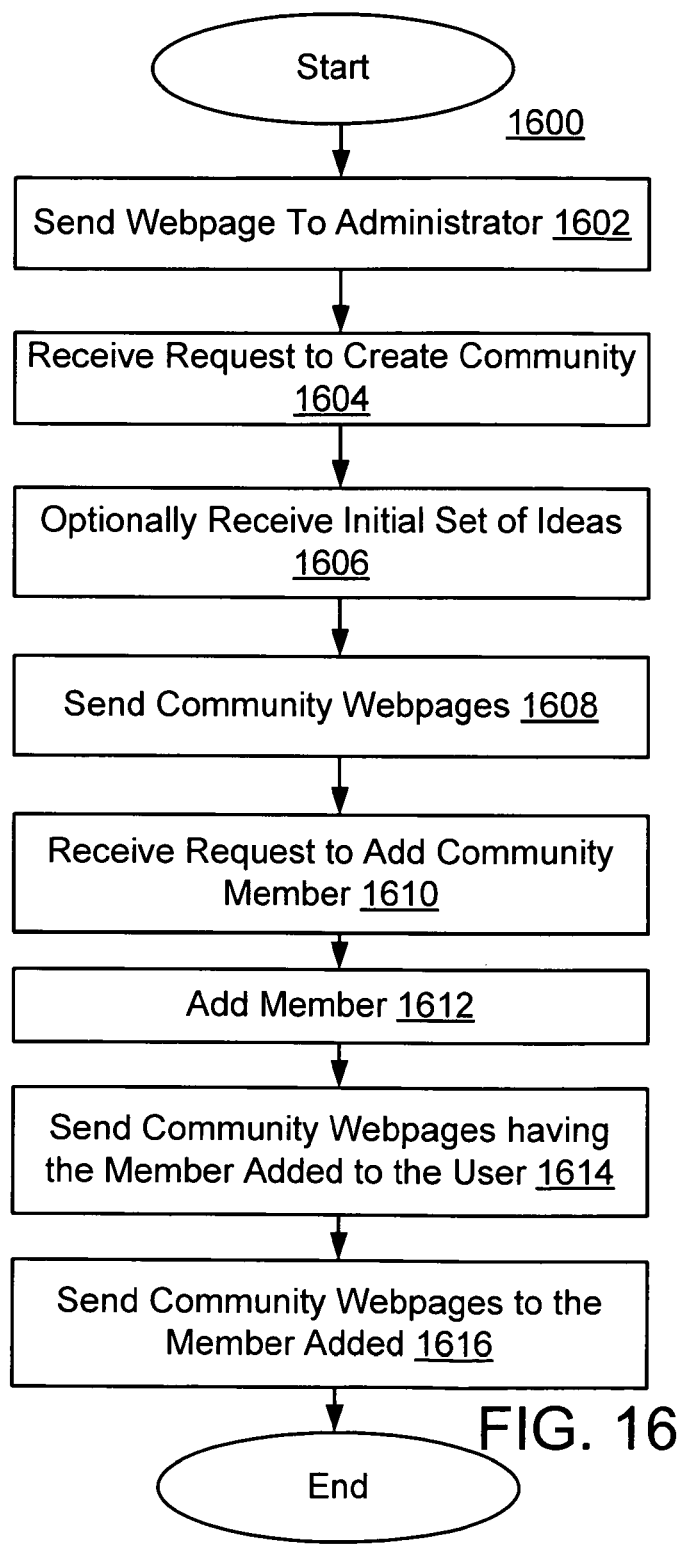
FIG. 16 is a flowchart of an embodiment of a server-side method of creating a community on-demand.

FIG. 16 is a flowchart of an embodiment of a server-side method 1600 of creating a community on-demand. In step 1602, a webpage is sent to a user of a tenant (e.g., administrator, another employee, or a customer of a tenant). The webpage includes one or more links that initiate and/or facilitate creating a community with self-forming groups. For example, creating a community may include creating a community webpage populated with ideas and adding members to the community. In step 1604, a request is received from the user associated with the tenant at the server to create a community. The request may include a request to create a webpage for the community. In optional step 1606, a set of one or more ideas are sent to populate the webpage. The ideas relate to a particular topic or set of topics that the community members are expected to be concerned with. In step 1608, the community web pages are sent to the administrator and/or one or more members of the community. In an embodiment, step 1606 may be performed prior step 1608. In step 1610, a request is received at the server for adding a community member. Optionally, a request may include a request for adding several members at once. Optionally, prior to becoming members, an invitation to join the community is sent to the potential new member. In step 1612, the member is added to the community. In step 1614, a webpage is sent to the user with the new member added. In optional step 1616, a webpage is sent to the new member showing the new member as a member and/or an email confirmation may be sent to the member confirming their membership. In an embodiment, steps 1610, 1612, 1614, and/or 1616 may be performed multiple times (e.g., each time a new member or group of members is added) and may be performed before steps 1608 and/or 1606.

In an embodiment, each of the steps of method 1600 is a distinct step. In another embodiment, although depicted as distinct steps in FIG. 16, step 1602-1616 may not be distinct steps. In other embodiments, method xxx may not have all of the above steps and/or may have other steps in addition to or instead of those listed above. The steps of method xxx may be performed in another order. Subsets of the steps listed above as part of method 1600 may be used to form their own method.

Client-Side Method of Creating a Community On-Demand

Figure 17:
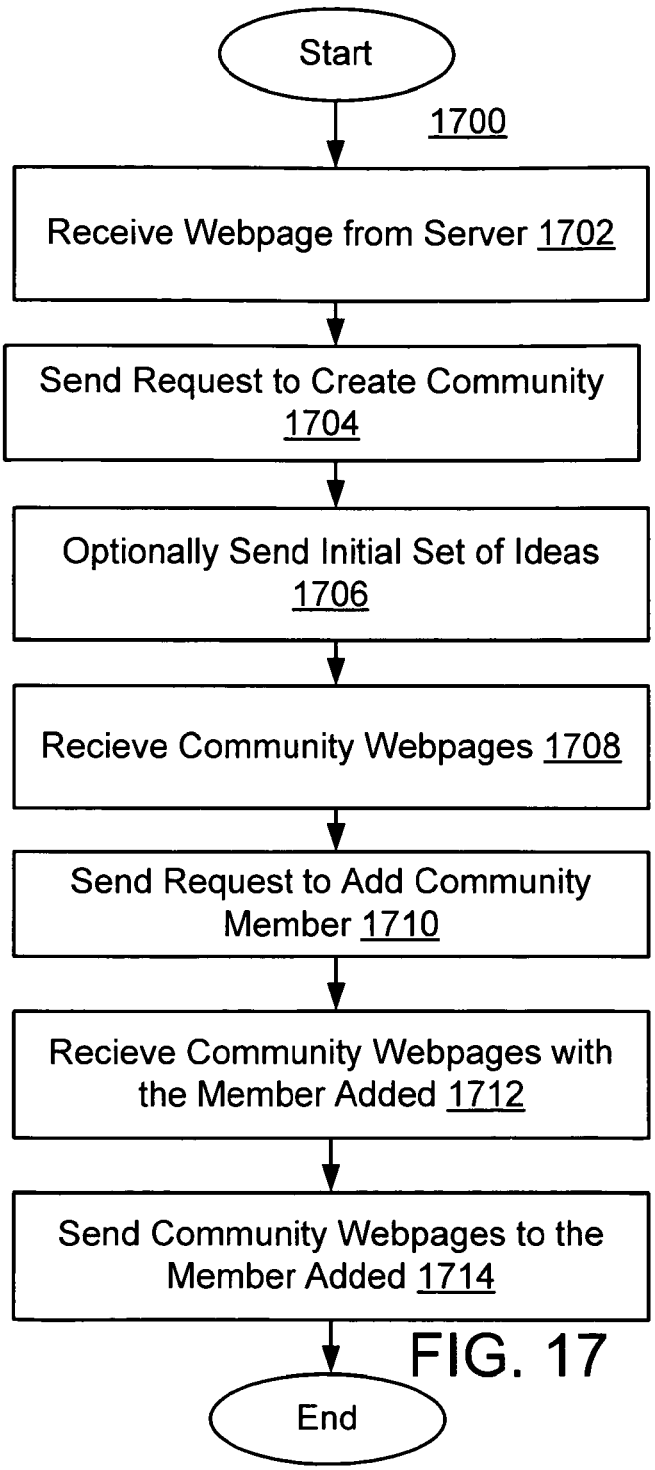
FIG. 17 is a flowchart of an embodiment of a client-side method of creating a community on demand.

FIG. 17 is a flowchart of an embodiment of a client-side method 1700 of creating a community on demand. In step 1702, a webpage is received by a user of a tenant from the server. The webpage may be the one sent in step 1602 and may include one or more links that initiate and/or facilitate creating a community with self-forming groups. For example, creating a community may include creating a community webpage populated with ideas and adding members tot eh community. In step 1704, a request is sent from the user to the server to create a community. The request may include a request to create a webpage for the community. In optional step 1706, a set of one or more ideas are sent from the user to the server for populating the webpage. The ideas may relate to a particular topic or set of topics that the community members are expected to be concerned with. In step 1708, the community webpages are received by the administrator and/or one or more members of the community. In an embodiment, step 1706 may be performed prior step 1708. In step 1710, a request is sent from the user to the server for adding a community member. Optionally, the request may include a request for adding several members at once and/or for sending invitation to the potiential new members to become members. In optional step 1712, a webpage is received by the user showing the new member as a member and/or an email confirmation may be received by the member confirming their membership. In optional step 1714, a webpage is received by the new member showing the new member as a member and/or an email confirmation may be received by the member confirming their membership. In an embodiment, steps 1710, 1712, and/or 1714 may be performed multiple times (e.g., each time a new member or group of members is added) and may be performed before steps 1708 and/or 1706.

In an embodiment, each of the steps of method 1700 is a distinct step. In another embodiment, although depicted as distinct steps in FIG. 17, step 1702-1714 may not be distinct steps. In other embodiments, method xxx may not have all of the above steps and/or may have other steps in addition to or instead of those listed above. The steps of method 1700 may be performed in another order. Subsets of the steps listed above as part of method 1700 may be used to form their own method.

Using a Website Having Communities that were Created On-Demand

Figure 18:
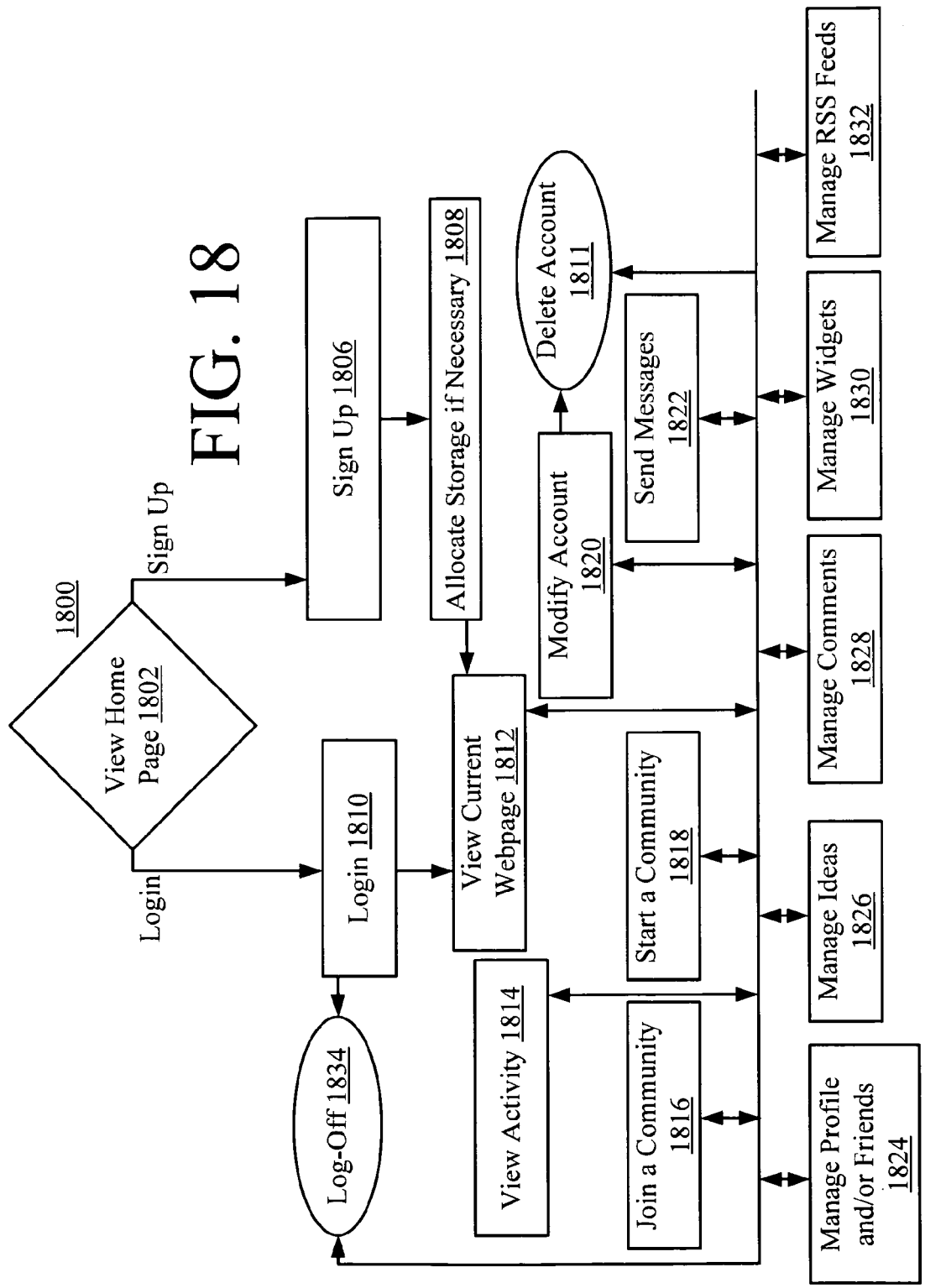
FIG. 18 is a flowchart of an embodiment of a method 1800 for managing an on-demand community website.

FIG. 18 is a flowchart of an embodiment of a method 1800 for managing an on-demand community website. In step 1804, a webpage is presented to a user that gives a user a choice of whether to login or sign up to become a member. If the user decides to sign up, the method continues with step 1806, where the user signs up. In step 1808, if necessary, storage is allocated for the new member. After step 1808, method 1800 proceeds to step 1812. Returning to step 1804, if the user decides to login, method 1800 continues to step 1810. At step 1810, the user logs in, and then the method continues to step 1812. In step 1812, the user is presented with a webpage that has several options. From the options the user may perform any of another of steps by either directly selecting one of the links of the current page or by selecting a link that leads to another link or by selecting each of several links in a chain of links, which allows the user to perform one of many tasks. Consequently, after step 1812, the user may select any of steps 1811-1834. After each of steps 1811-1834, the user may return to step 1812. At different times the webpage viewed in step 1812 may be different. In step 1811, if selected, the user may delete the account. In step 1814, the user may view activities on the community website. In step 1816, the user may join a community. There may be several communities, and the user may have the option of which communities to join. In step 1818, the user may start a website for a community on demand. In step 1820, the user may modify the account by, for example, changing the services being purchased or by deleting the account. In step 1822, the user may send a message. The message may be a request to join the community or may be a message left on a profile or sent to a profile owner as a result of selecting a link on profile 600 (FIG. 6) to send a message. In step 1824, the user may manage their profile and/or friends pages, such as by starting a new friends and/or profile page, adding new information to existing friends or profile pages, or by changing the current content. In step 1826, the user manages ideas. As part of step 1826, ideas may be modified and/or posted. In step 1828, the user manages comments. As part of step 1828, comments may be modified and/or posted. In step 1830, the user manages widgets. As part of step 1830, the widgets may be modified and/or created. In step 1832, the user manages RSS feeds. As part of step 1832, the RSS feeds may be modified and/or created. In step 1834, the user logs off.

At each of the steps of method 1800 there may be three sub-steps that are performed on the server side and two sub-steps that are performed on the client side. On the server side, the server receives a request to perform the step, the server performs the step, and then the server sends the results to the user. On the client side, the user sends a request to perform the step, and the client receives the result of the server responding to the request. In an embodiment, each of the steps of method 1800 is a distinct step. In another embodiment, although depicted as distinct steps in FIG. 18, step 1802-1832 may not be distinct steps. In other embodiments, method 1800 may not have all of the above steps and/or may have other steps in addition to or instead of those listed above. The steps of method 1800 may be performed in another order. Subsets of the steps listed above as part of method 1800 may be used to form their own method.

Method for Using the Environment (FIGS. 1 and 2)

Figure 19:
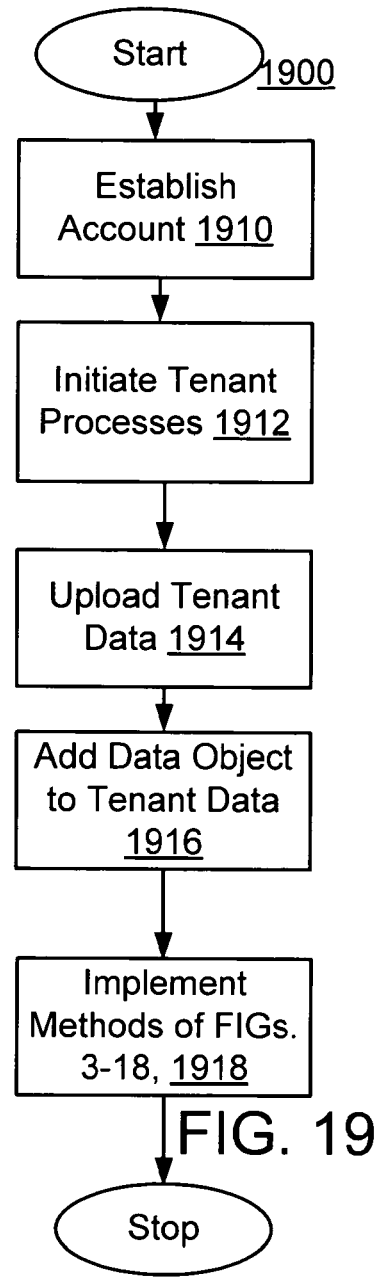
FIG. 19 shows a flowchart of an example of a method 1 of using environment 10.

FIG. 19 shows a flowchart of an example of a method 1900 of using environment 10. In step 1910, user system 12 (FIGS. 1 And 2) establishes an account. In step 1912, one more tenant process space 104 (FIG. 2) are initiated on behalf of user system 12, which may also involve setting aside space in tenant space 112 (FIG. 2) and tenant data 114 (FIG. 2) for user system 12. Step 1912 may also involve modifying application metadata to accommodate user system 12. In step 1914, user system 12 uploads data. In step 1916, one or more data objects are added to tenant data 114 where the data uploaded is stored. In step 1918, the methods associated with FIGS. 3-18 may be implemented. In an embodiment, each of the steps of method 1900 is a distinct step. In another embodiment, although depicted as distinct steps in FIG. 19, step 1902-1918 may not be distinct steps. In other embodiments, method 1900 may not have all of the above steps and/or may have other steps in addition to or instead of those listed above. The steps of method 1900 may be performed in another order. Subsets of the steps listed above as part of method 1900 may be used to form their own method.

Method for Creating the Environment (FIGS. 1 and 2)

Figure 20:
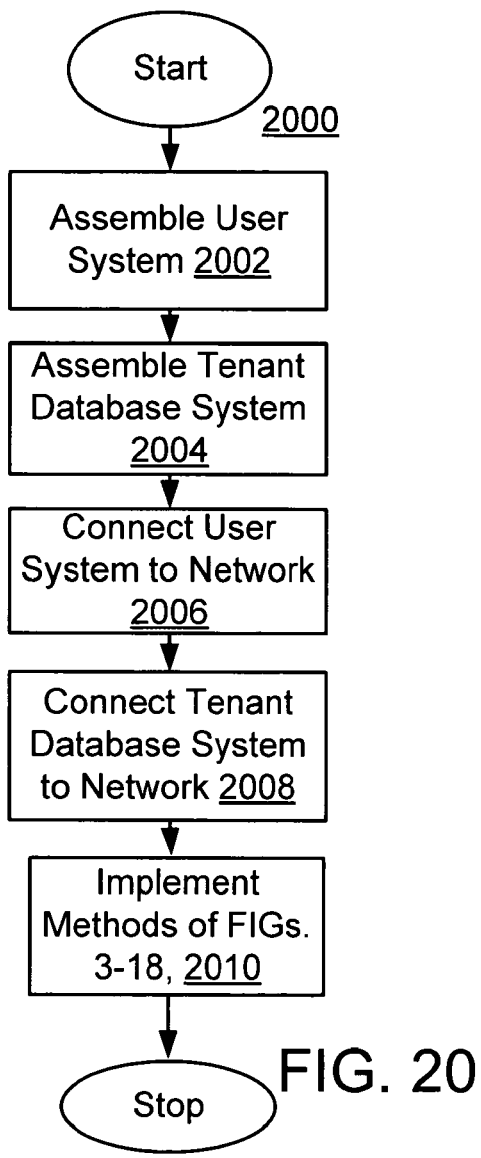
FIG. 20 is a method of making the environment of FIG. 1.

FIG. 20 is a method of making environment 10, in step 2002, user system 12 (FIGS. 1 And 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2004, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers 100₁-100ₙ, system process space 102, tenant process spaces 104, tenant management process space 110, tenant space 112, tenant data 114, and application metadata 116 (FIG. 2).

In step 2006, user system 12 is communicatively coupled to network 104. In step 2008, system 16 is communicatively coupled to network 104 allowing user system 12 and system 16 to communicate with one another (FIG. 2). In step 2010, one or more instructions may be installed in system 16 (e.g., the instructions may be installed on one or more machine readable media, such as computer readable media, therein) and/or system 16 is otherwise configured for performing the steps of methods associated with FIGS. 3-18. For example, as part of step 2010, one or more instructions may be entered into the memory of system 16 for providing and using on-demand communities. In an embodiment, each of the steps of method 2000 is a distinct step. In another embodiment, although depicted as distinct steps in FIG. 20, step 2002-2010 may not be distinct steps. In other embodiments, method 2000 may not have all of the above steps and/or may have other steps in addition to or instead of those listed above. The steps of method 2000 may be performed in another order. Subsets of the steps listed above as part of method 2000 may be used to form their own method.

EXTENSIONS AND ALTERNATIVES

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer program product, comprising a non-transitory computer usable medium having a computer readable program code embodied therein, the computer readable program code adapted to execute a method for implementing on-demand communities, the method comprising:
    receiving a request from a user to post an idea on a profile page of the user, wherein the profile page includes at least a collection of personal data of the user;
    in response to receiving the request, posting the idea on the profile page;
    sending at least one idea webpage having existing ideas posted thereon to the user, wherein the at least one idea webpage has tools for receiving votes from the user for the posted existing ideas;
    linking the posted idea on the profile page of the user to the at least one idea webpage; and
    allowing other users to view and vote on the posted idea of the user;
    wherein the profile page includes:
        information related to a number of votes received for the posted idea of the user, and
        a facility for the other users to send messages to the user.

2. The computer program product of claim 1, the user being an administrator that administrates a tenant's portion of a multi-tenant database.

3. The computer program product of claim 1, the webpage including one or more webpages having one or more Uniform Resource Locators (URLs) in a format appropriate for copying the one or more URLs.

4. A method for implementing on-demand communities, comprising:
    receiving a request from a user to post an idea on a profile page of the user, wherein the profile page includes at least a collection of personal data of the user;
    in response to receiving the request, posting the idea on the profile page;
    sending at least one idea webpage having existing ideas posted thereon to the user, wherein the at least one idea webpage has tools for receiving votes from the user for the posted existing ideas;
    linking the posted idea on the profile page of the user to the at least one idea webpage; and
    allowing other users to view and vote on the posted idea of the user;
    wherein the profile page includes:
        information related to a number of votes received for the posted idea of the user, and
        a facility for the other users to send messages to the user.

5. A system for implementing on-demand communities, comprising:
    a computer processor; and
    one or more stored sequences of computer instructions which, when executed by the computer processor, cause the computer processor to carry out the following steps of:
        receiving a request from a user to post an idea on a profile page of the user, wherein the profile page includes at least a collection of personal data of the user;
        in response to receiving the request, posting the idea on the profile page;
        sending at least one idea webpage having existing ideas posted thereon to the user, wherein the at least one idea webpage has tools for receiving votes from the user for the posted existing ideas;
        linking the posted idea on the profile page of the user to the at least one idea webpage; and
        allowing other users to view and vote on the posted idea of the user;
        wherein the profile page includes:
            information related to a number of votes received for the posted idea of the user, and
            a facility for the other users to send messages to the user.

6. The computer program product of claim 1, wherein the profile page further includes a discussion in which the user participates.

7. The computer program product of claim 1, wherein the profile page further includes a list of friends of the user.

* * * * *